US007207475B2

(12) United States Patent
Tanaka

(10) Patent No.: US 7,207,475 B2
(45) Date of Patent: Apr. 24, 2007

(54) IMAGE-FORMING-APPARATUS USE MANAGING METHOD, IMAGE-FORMING-APPARATUS SELLING METHOD AND IMAGE FORMING APPARATUS

(75) Inventor: Shinji Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 609 days.

(21) Appl. No.: 09/958,925

(22) PCT Filed: Feb. 16, 2001

(86) PCT No.: PCT/JP01/01131

§ 371 (c)(1),
(2), (4) Date: Apr. 12, 2002

(87) PCT Pub. No.: WO01/61459

PCT Pub. Date: Aug. 23, 2001

(65) Prior Publication Data

US 2002/0134829 A1   Sep. 26, 2002

(30) Foreign Application Priority Data

Feb. 16, 2000  (JP) .............................. 2000-037388
Jul. 19, 2000  (JP) .............................. 2000-219043

(51) Int. Cl.
*G06F 17/00* (2006.01)

(52) U.S. Cl. ..................... 235/375; 253/485; 253/487

(58) Field of Classification Search ................ 235/375, 235/378, 485, 487; 902/18, 6; 347/19–20, 347/85; 358/1.1, 1.14
See application file for complete search history.

(56) References Cited

U.S. PATENT DOCUMENTS

| 5,812,156 | A  |   | 9/1998  | Bullock et al. |
| 6,158,850 | A  | * | 12/2000 | Cook .......................... 347/85 |
| 6,312,106 | B1 | * | 11/2001 | Walker ........................ 347/50 |
| 6,460,763 | B1 | * | 10/2002 | Yoshinaga et al. .......... 235/375 |
| 6,557,963 | B1 | * | 5/2003  | Ikeda .......................... 347/14 |
| 6,612,494 | B1 | * | 9/2003  | Outwater ............... 235/462.04 |
| 6,771,378 | B2 | * | 8/2004  | Akiyama et al. .......... 358/1.14 |
| 6,820,955 | B1 | * | 11/2004 | Usui .............................. 347/7 |
| 2003/0058471 | A1 | * | 3/2003 | Okubo ...................... 358/1.16 |

FOREIGN PATENT DOCUMENTS

JP   62-184856   8/1987

(Continued)

*Primary Examiner*—Thien M. Le
*Assistant Examiner*—Edwyn Labaze
(74) *Attorney, Agent, or Firm*—Sughrue Mion, PLLC

(57) ABSTRACT

A printer capable of controlling the operation capability of an image-forming device according to a user's utilization mode. Operation capability designation information for designating the operation capability of the image-forming device is rewritably held in an EEPROM (34) provided in the print controller (30) of the image forming device. The CPU (31) of the print controller (30) judges whether or not a printing request sent from a computer (40) falls within a capability range designated by the held operation capability designation information. If within a capability range, a print engine (10) is caused to form an image. As the capability, a usable amount of ink to be contained in an ink cartridge (20) can be set.

43 Claims, 33 Drawing Sheets

FOREIGN PATENT DOCUMENTS

| | | |
|---|---|---|
| JP | 03-029019 | 2/1991 |
| JP | 05-169674 | 7/1993 |
| JP | 06-126981 | 5/1994 |
| JP | 07-306730 | 11/1995 |
| JP | 08-036470 | 2/1996 |
| JP | 08-084212 | 3/1996 |
| JP | 08-265189 | 10/1996 |
| JP | 09-083681 | 3/1997 |
| JP | 09-120241 | 5/1997 |
| JP | 09-156118 | 6/1997 |
| JP | 09-207351 | 8/1997 |
| JP | 10-161823 | 6/1998 |
| JP | 10-217509 | 8/1998 |
| JP | 11-008743 | 1/1999 |
| JP | 11-098291 | 4/1999 |
| JP | 11-134136 | 5/1999 |
| JP | 11-168589 | 6/1999 |
| JP | 11-170555 | 6/1999 |
| JP | 11-184689 | 7/1999 |
| JP | 11-219292 | 8/1999 |
| JP | 11-249854 | 9/1999 |
| JP | 11-309872 | 11/1999 |
| JP | 11-348308 | 12/1999 |
| JP | 2000-006440 | 1/2000 |
| JP | 2000-501666 | 2/2000 |
| JP | 2000-326600 | 11/2000 |
| WO | WO 97/21548 | 6/1997 |

\* cited by examiner

FIG.14

PRINTER USE CONTRACT
STEP 1 : INPUT PERSONAL INFORMATION

NAME :
ADDRESS :
TEL. NO.
} 561

CREDIT CARD INFORMATION
COMPANY :
NO.
AVAILABLE PERIOD :
E - MAIL :
} 562

TRANSMIT   CANCEL
563        564

FIG.30

| PRODUCT CODE (2511) | USE ALLOWABLE-AMOUNT INITIAL SETTING VALUE (2512) | SELLING PRICE (2513) | USE ALLOWABLE-AMOUNT ADDITIONAL SETTING VALUE (2514) | SELLING PRICE (2515) |
|---|---|---|---|---|
| * * * * | | | | |
| | | | | |
| | | | | |
| | | | | |
| | | | | |

FIG.31

USE ALLOWABLE - AMOUNT SETTING

USE ALLOWABLE - AMOUNT REQUEST VALUE
○ 25%   ● 50%   ○ 75%   ○ 100%

NAME:
ADDRESS:
TEL. NO.

SELLING PRICE

CREDIT CARD INFORMATION
COMPANY:
NO.
GOOD THRU:
E - MAIL:

TRANSMIT   CANCEL

IMAGE-FORMING-APPARATUS USE MANAGING METHOD, IMAGE-FORMING-APPARATUS SELLING METHOD AND IMAGE FORMING APPARATUS

TECHNICAL FIELD

The present invention relates to an art to manage the operation capability of an image forming apparatus and, more particularly, to an art to manage the operation capability of an image forming apparatus depending upon the information designating an operation capability.

BACKGROUND OF THE INVENTION

The image forming apparatuses include imager devices for imaging a subject to record an image thereof, devices for capturing as an image a document or the like describing texts, images, etc. and devices for forming a computer-generated image, a scanner-captured image or imager-shot image onto a paper. The imager devices include, for example, digital cameras. Meanwhile, the devices for capturing an image of a document, etc. include, for example, scanners. Furthermore, the devices for forming an image on a paper include, for example, printers.

The printer is to form a visible image matched to a subject image by the use of ink, toner or the like. The image forming apparatus of this kind include, for example, ink jet printers, laser beam printers and so on. The image forming apparatuses of this kind are placed in mass-production and price-reduction owing to widespread personal computers. Hence, there is an increasing tendency that they are possessed and used personally.

In the meanwhile, the image forming apparatuses, if same, are used in various ways by the users. There are various use ways, e.g., text print, image print not requiring especially high resolution, color print with multi colors not requiring complicated hue, and high-leveled color print requiring delicate hue. Moreover, the users not necessarily apply the use ways herein exemplified in a completely equivalent manner. Rather, there are deviated ways of use.

This is true for the utilization frequency of the image forming apparatus. There are variations in utilization frequency depending upon the user, e.g., some users who do print infrequently and other users who frequently do print.

Meanwhile, from the standpoint of the maker supplying the image forming apparatuses, cost reduction is intended by the mass production with standardizing the product to a possible extent. This requires to decrease the kinds of products to a possible less extent However, there are a variety of user's utilization forms. For this reason, manufacture products are intended to have increased functions and improved performances in order to meet a variety of user's needs.

However, conventionally it has been a general practice to set the price of an image forming apparatus with reference to a manufacturer's desired selling price, depending upon the sale in a marketplace. The user purchases an image forming apparatus at a market price to use it for his or her own purpose. Namely, it can be considered that there has been so-far no direct relationship between the selling price of an image forming apparatus and the utilization way by the user. Hence, the price upon selling is not affected by how to utilize.

Meanwhile, the image forming apparatus requires a recording material, e.g., toner, ink or the like. These are consumables and require supplement. Accordingly, the user purchases new toner, ink or the like, to detach the container used of toner, ink or the like from the image forming apparatus and attach a new container filled with recording material onto the image forming apparatus.

In the meanwhile, the recording material, e.g. ink, is marketed in a form of a constant quantity filled within a predetermined-sized cartridge. This is true for toner. On the other hand, the image forming apparatuses even if same are used in various ways from one user to another. For example, there are users who require an great amount of print to consume a great deal of recording material, e.g. ink whereas there are other users who require a reduced amount of print to consume a less amount of ink.

However, at present, no marketing is being available on the cartridges dependent upon the user's use form. This is due to one reason that the production of a plurality of kinds of cartridges changed in ink amount results in cost increase.

DISCLOSURE OF THE INVENTION

It is the first object of the present invention to provide an art for managing the operation capability of an image forming apparatus to meet the utilization form of the user.

The second object of the present invention is to provide an art for supplying a recording material at a price in accordance with user's expected amount.

In order to achieve the first object, according to the first aspect of the invention, there is provided a method of managing the use of an image forming apparatus, the image forming apparatus use managing method characterized by comprising: rewritably holding operation capability designation information for designating to the image forming apparatus an operation capability thereof; and forming an image within a range of an operation capability designated by the held operation capability designation information.

According to the second aspect of the invention, there is provided, in a method of selling an image forming apparatus, the image forming apparatus selling method characterized in that:

operation capability designation information for designating an operation capability is supplied to an image forming apparatus provided with a memory to rewritably hold operation capability designation information for designating an operation capability of the image forming apparatus, whereby a billing process is carried out depending upon the supply.

According to the third aspect of the invention, there is provided, in a printing apparatus for carrying out print on a paper, the printing apparatus comprising:

means for rewritably holding operation capability designation information for designating an operation capability of the printing apparatus;

means for determining whether an inputted print request can utilize the printing apparatus, depending on, print data, information representative of a utilization status of the printing apparatus and the operation capability designation information; and means for carrying out a print operation where it is determined that the print request can utilize the printing apparatus.

According to the fourth aspect of the invention, there is provided, in a system for providing information for designating an operation capability of an image forming apparatus, the operation capability providing system for the image forming apparatus characterized by comprising:

means for accepting a designation request of an operation capability of the image forming apparatus; and means for transmitting the operation capability designation information to a request source.

According to the fifth aspect of the invention, there is provided a method of managing the use of an image forming apparatus for forming an image, the use managing method for the image forming apparatus comprising:

storing, to an image forming apparatus, operation capability designation information for designating an operation capability of the apparatus;

maintaining the image forming apparatus in a usable state where a use request for the apparatus is within a range of an operation capability represented by the operation capability designation information; and placing the image forming apparatus in a non-usable state where the use request for the apparatus is out of the range of an operation capability represented by the operation capability designation information.

According to the sixth aspect of the invention, there is provided a method of providing an image forming apparatus for forming an image, the image forming apparatus providing method characterized by comprising:

preparing an image forming apparatus having storing means wherein, when information for designating an operation capability is written to the storing means, a corresponding image forming operation is made possible to carry out on the basis of the information, and a recording medium recorded therein operation capability designation information for designating the operation capability; and reading the operation capability designation information out of the recording medium to write the information to the storing means thereby making the image forming apparatus having the storing means in a usable state.

Meanwhile, in order to achieve the second object, according to the seventh aspect of the invention, there is provided a method of providing a recording material to be used in forming an image in an image forming apparatus, the recording material providing method characterized in that:

to a memory attached to a container containing a recording material is written operation capability designation information for designating an operation capability of the image forming apparatus using the recording material, thereafter providing a recording material.

Also, when receiving a setting request for information representative of a use allowable amount through a network, information representative of the usable capacity corresponding to the request can be forwarded as information for writing to the memory to a request source of the setting request through a network.

BRIEF DESCRIPTION OF THE DRAWINGS

FIG. 14 is an explanatory view showing a display screen example for personal information input upon making a use contract to the contract server;

FIG. 30 is an explanatory view showing one example of data items concerning use-allowable amount to be stored in a database and set for each ink cartridge;

FIG. 31 is an explanatory view showing one example of a screen for use-allowable-amount setting to be displayed on a display unit of the user system;

BEST MODE FOR CARRYING OUT THE INVENTION

Hereunder, embodiments of the invention will be explained with reference to the drawings, respectively. The below embodiments will be explained with exemplifying an image forming apparatus for visibly fixing the image data processed by a computer onto the paper. The below embodiments will be explained with exemplifying, as an image forming apparatus, a printer for carrying out printing using an ink cartridge. The invention is not limited to this. For example, the invention is applicable also to a laser beam printer for printing using toner, and the like. Furthermore, the invention is applicable also for the operation capability management for an imaging device such as a digital camera and the operation capability management for an image-capturing device such as a scanner.

Figure 1:
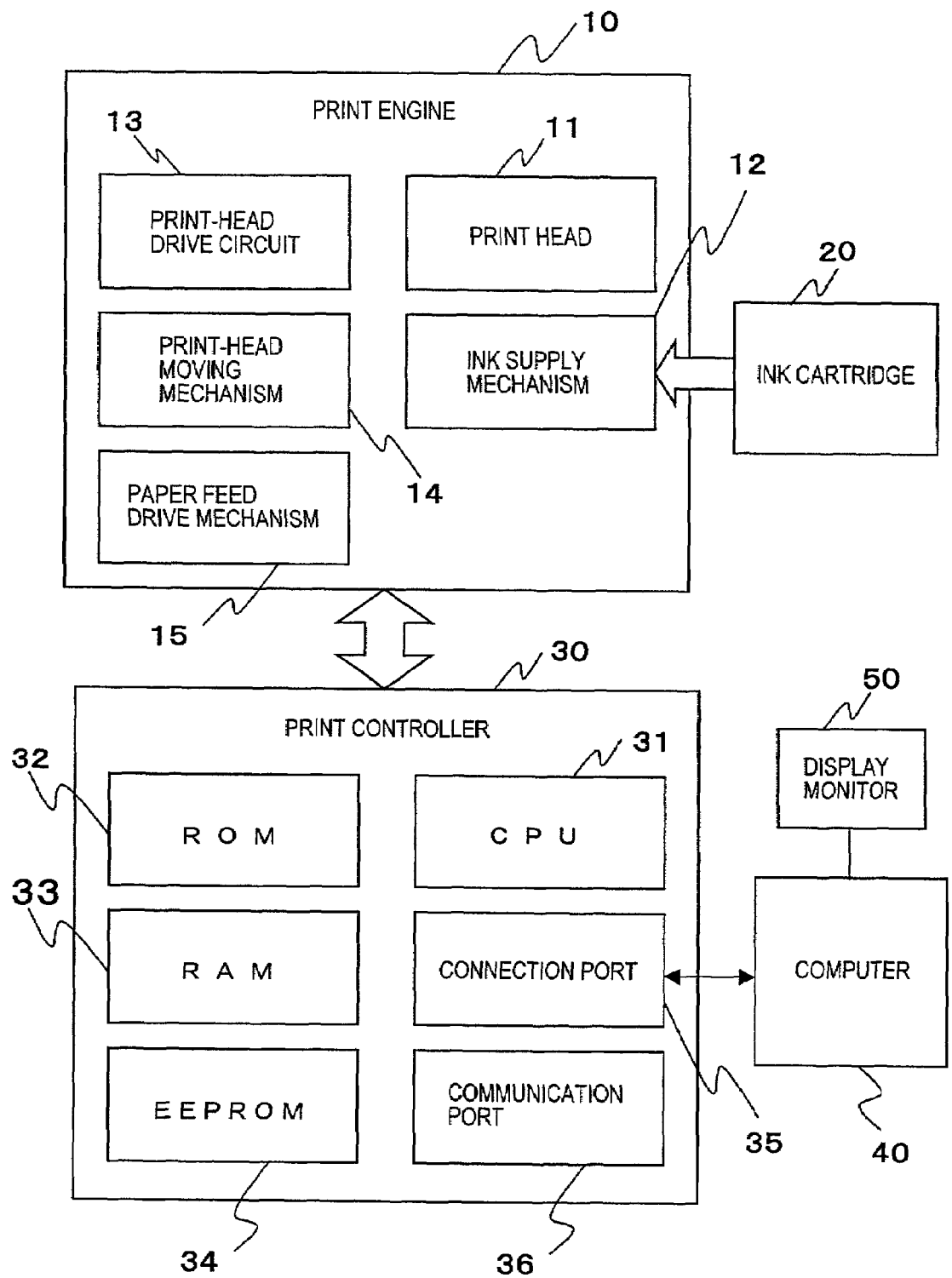
FIG. 1 is a block diagram showing a first embodiment of an image forming apparatus according to the present invention.

FIG. 1 shows an example of a structure of an image forming apparatus according to a first embodiment of the invention. The image forming apparatus shown in FIG. 1 has a print engine 10 for forming an image on a paper and a print controller 30 for controlling the image formation in the print engine 10. An ink cartridge 20 is loaded to the print engine 10. Meanwhile, the print controller 30 is connected to a computer 40 directly or through a network, such as a LAN.

The print engine 10 has a print head 11 to eject ink and form an image on a paper, an ink supply mechanism 12 to supply ink from the ink cartridge 20 to the print head 11, a print-head drive circuit 13 to cause the print head 11 to make an ink-eject action, a print-head moving mechanism 14 to move the print head and a paper-feed drive mechanism 15 to feed the paper. The ink supply mechanism 12, print-head drive circuit 13, print-head moving mechanism 14 and paper-feed drive mechanism 15 causes the print head 11 to visibly form an image of provided print data onto a paper, under the control of the print controller 30.

The print controller 30 has a central processor unit (CPU) 31, a read only memory (ROM) 32 to store the program executed by the CPU 31, a random access memory (RAM) 33 to store programs, data and the like, an EEPROM 34 as a rewritable non-volatile memory, a connection port 35 for connection to the computer or the like and a communication port 36 for connection to the LAN.

In this embodiment, the print controller 30 is locally connected to the computer 40 through the connection port 35.

Figure 2:
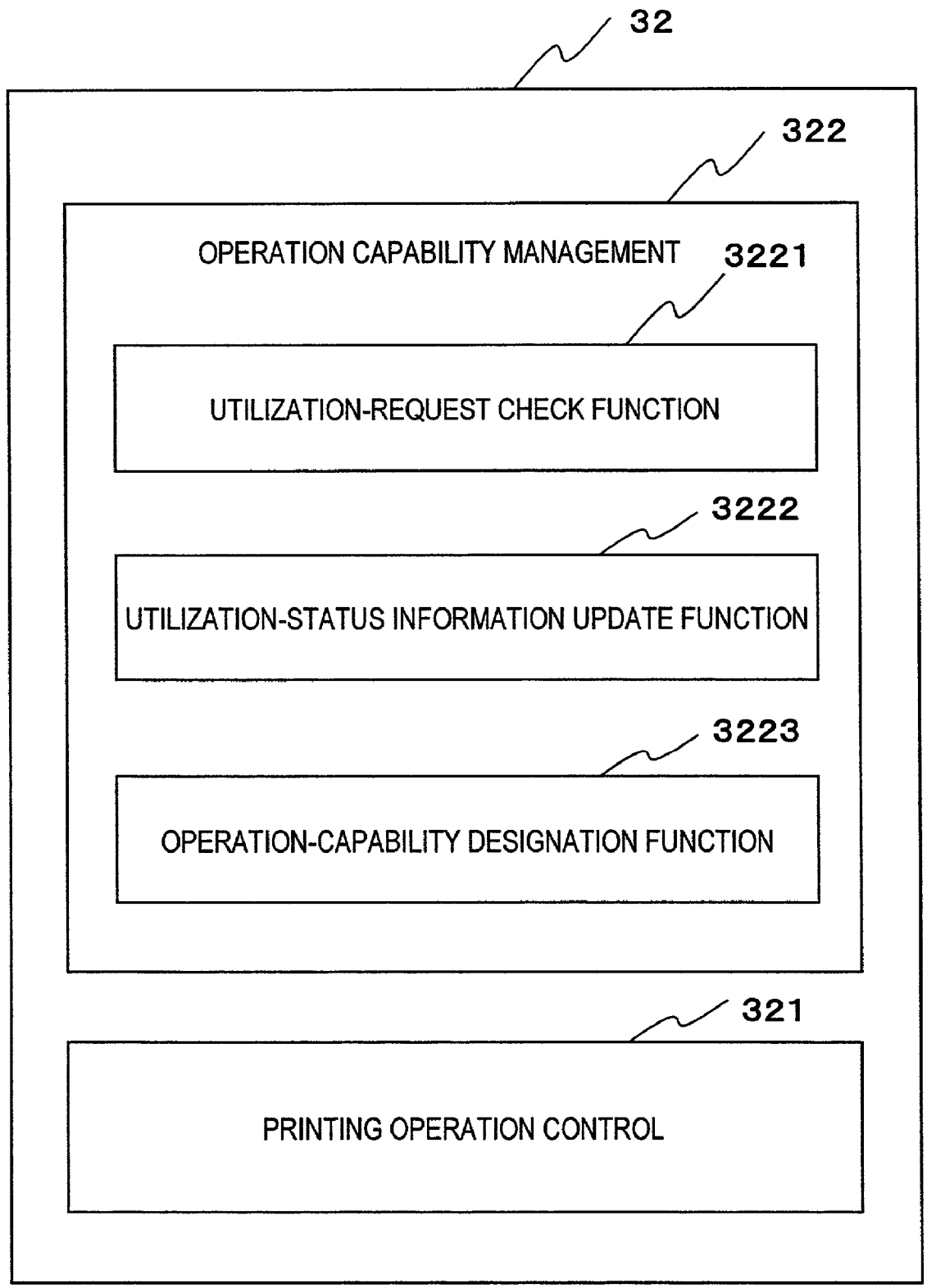
FIG. 2 is a block diagram showing one example of a program for realizing a print controller function of a printer according to the invention.

As shown in FIG. 2, the ROM 32 is stored, at least, with a program 321 for printing-operation control to process the image data delivered from the computer 40 and forward it to the print engine 10 in order to cause it to carry out printing, and an operation capability control program 322 to control the operation capability of the printer. These programs are to be executed by the CPU 31 thereby realizing the corresponding functions. The operation-capability control program 322 includes a program 3221 for realizing a utilization-request check function to check if utilization is available or not where there is a printer-utilization request, a program 3222 for realizing a function to update the data representative of a printer-utilization status, and a program 3223 for realizing a function to designate an operation capability of the printer.

The program 3221 for realizing the utilization-request check function causes the printing operation control program 321 to perform printing operation where it is determined for the utilization request that printer is available. On the other hand, where the program 3221 determines that the utilization request can not utilize the printer, it does not cause the printing operation control program 321 to perform a print action. Namely, utilization is refused. In this case, notification that, for example, the operation capability should be reset is made, for example, to the computer 40. Meanwhile, where a panel 38 is provided on the printer (see FIG. 6), a message or symbol seeking for resetting the operation capability is displayed on the panel 38.

Figure 10:
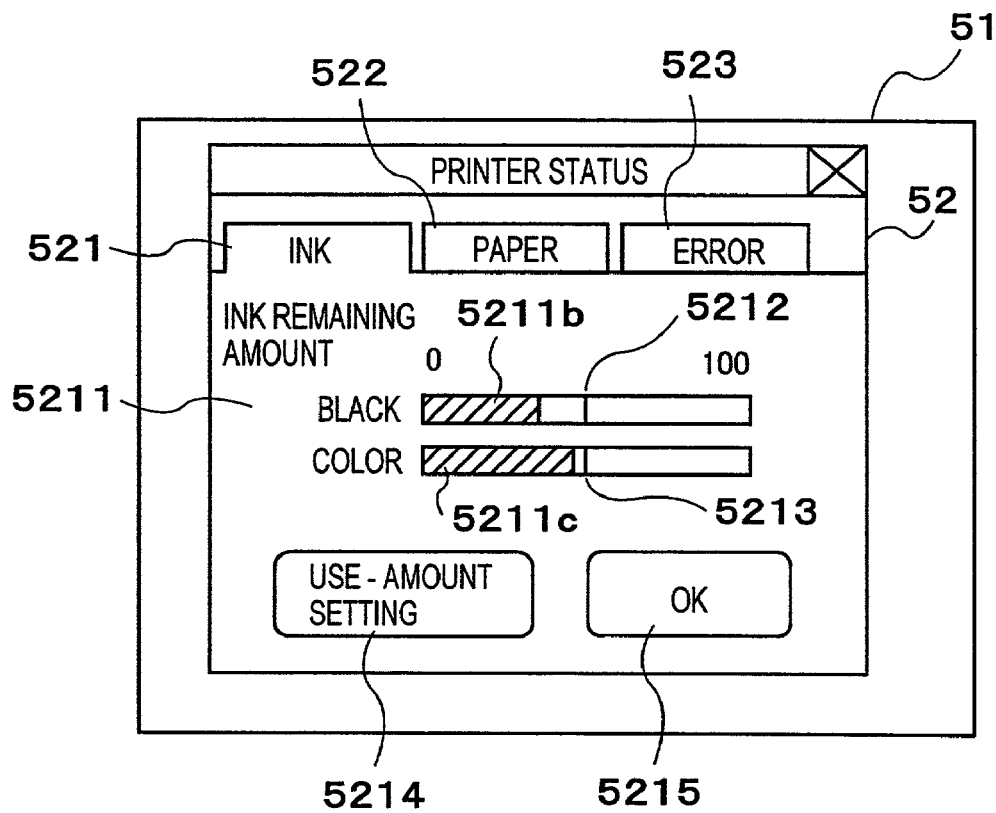
FIG. 10 is an explanatory view showing a screen example illustrating a printer status displayed on a display monitor of a computer.

The program 3222 for realizing the function to update the utilization-status showing data acquires the information representative of a utilization status of the printer and updates the information so far stored. Specifically, every time printing is carried out, an ink amount to be used is determined to calculate a cumulative ink usage, thereby updating the information representative of the so-far ink usage, which has been stored in the EEPROM 34. This information is delivered to the computer 40 and displayed with a bar in an ink remaining-amount display region 5221 shown in FIG. 10. In FIG. 10, hatched areas 5211b and 5211c show an amount that has been used so far, respectively. On the other hand, the other area in the ink remaining-amount display region 5211 (the area shown in white on the figure) shows a remaining amount. Incidentally, the remaining amount may be shown by the hatched areas 5211b and 5211c.

Figure 11:
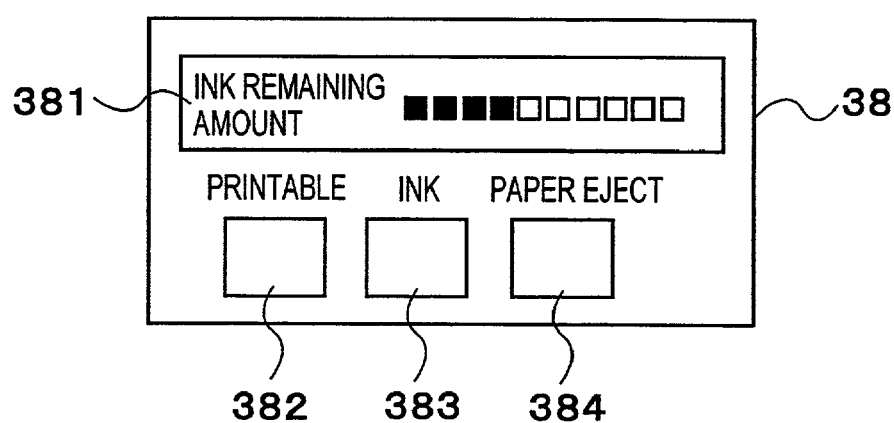
FIG. 11 is an explanatory view showing an arrangement example of display and operation buttons on a printer panel.

Also, where the printer has a panel (see FIG. 6), as shown in FIG. 11 a status indicating area 381 is caused to display an ink remaining amount. Note that there are provided on the printer panel 38, besides this, a print-allowing button 382 for instructing printing, an instruction button 383 for instructing the display concerning ink, a button 384 for instructing paper ejection, and so on. Of course, these are mere examples.

The program 3223 for realizing operation capability designation function is used upon initial setting of the printer and in updating operation-capability designation, as mentioned below. This program, as mentioned below, is started up and carries out processing of updating use-limit information when operation capability designation, e.g. use-limit update, is requested. For example, this is started up when a use-limit update is requested from the computer 40 in order to designate an operation capability; when loading a memory card to which the use-limit information as one kind of operation capability designation information is stored; or when the use-limit information is inputted through the printer panel. The program 3223, upon initial setting, first sets use-limit information. Meanwhile, upon resetting, new use limit including the remaining use limit is set. Furthermore, this program 3223 can be set to start up due to the execution of a predetermined use-allowing program.

Note that, the present embodiment stores the operation capability control program in the ROM 32. However, this may be stored in the EEPROM 34. This makes it possible to provide even the existing printer with the function of the present invention. Also, this can be configured to receive, each time of update, the operation capability program on condition that the operation capability program is executed only once each time.

Figure 3:
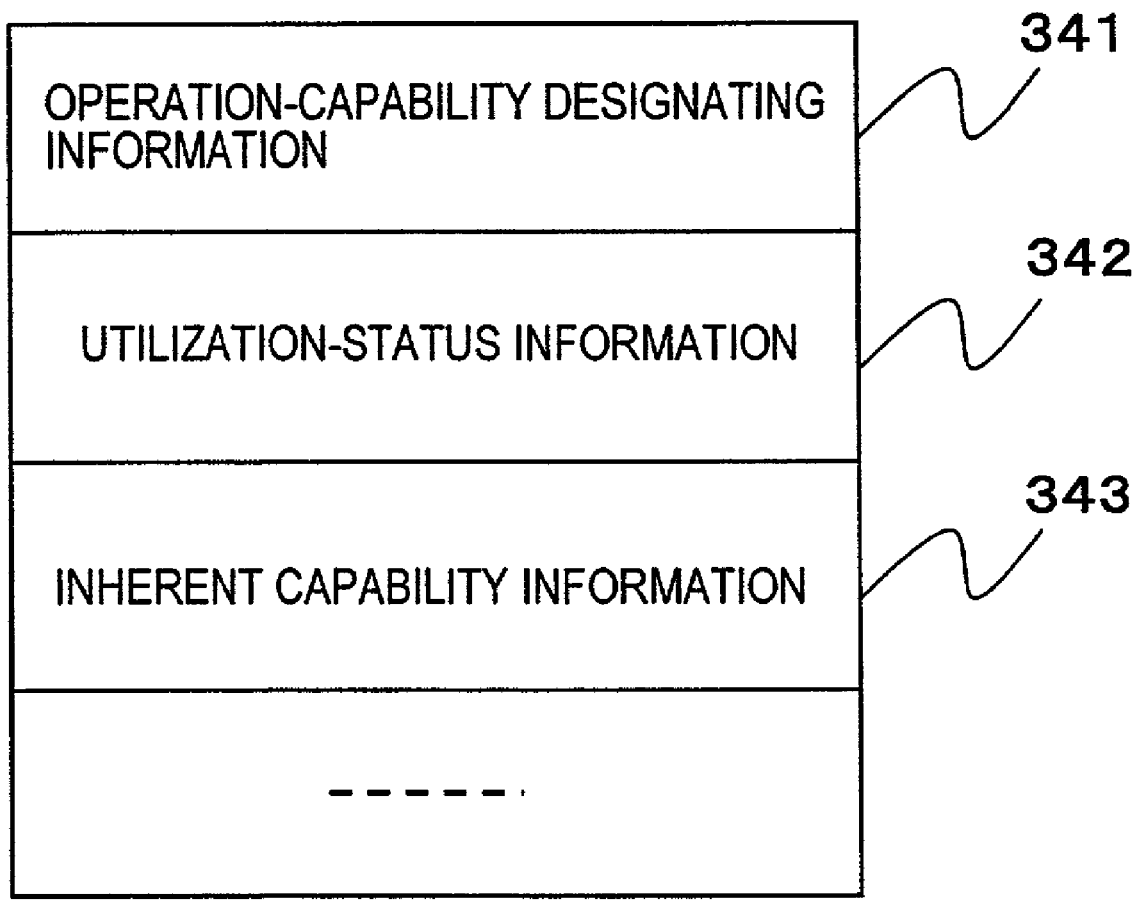
FIG. 3 is an explanatory view showing one example of a storage content in a non-volatile memory of a print controller storing the information representative of an operation capability of the printer.

The EEPROM 34 stores therein, as shown in FIG. 3, operation capability designation information 341 as information for designating an operation capability as to the printer, utilization-status information 342 representative of a utilization status of the printer mentioned below, a maximum limit possible to designate for the printer, i.e. inherent capability information representative of full specification, and so on. The operation capability designation information 341 includes the information to quantitatively designate a capability of the printer and the information to qualitatively designate a capability of the printer.

For example, the information quantitatively designating an operation capability includes information representative of a printer use limit. This, concretely, includes the use allowable amount of ink (an upper-limit amount of ink usable amount), the upper limit of the number of print pixels, the upper limit in the number of times of loading an ink cartridge and the upper limit of print count.

On the other hand, the information qualitatively designating an operation capability is designated, for example, as a printer operation specification. For example, there are designations of low resolution, high resolution, high speed and so on. Specifically, a plurality of operation models can be set on the printer wherein specifications are previously determined for the respective models to allow a user to select the designation. For example, previously set are a basic model and one or more extension models.

Herein, shown is the case of an example of an ink jet printer. First, the basic model is defined which has the functions of:
(1) communication function with the computer
(2) printing at 360 dpi
(3) color graphics printing with 4-color ink
(4) nonprintable regions (top 3 mm, bottom 14 mm), and
(5) printing with a single print dot diameter. Next, the expansion model is defined which has the functions of:
(1) printing with a plurality of print dot diameters
(2) printing at 720 dpi/1440 dpi
(3) color graphics printing with 6-color ink
(4) highs-speed printing
(5) edgeless photograph printing mode
(6) division printing (A0 size configured by a plurality of A4 sheets)
(7) image correcting function for digital cameras
(8) image auto-exposure correcting function, and
(9) color matching function.

Meanwhile, for a laser-beam printer, the basic model is defined which has the functions of:

(1) communication function with the computer
(2) printing at 300 dpi, and
(3) printing with a single print dot diameter. Next, the expansion model is defined which has the functions of:
(1) printing with a plurality of print dot diameters
(2) printing at 600 dpi/1200 dpi
(3) division printing (A0 size configured by a plurality of A4 sheets)
(4) image auto-exposure correcting function
(5) color matching function, and
(6) high-quality color correcting processing.

The user is allowed to select the designation of the printer operation capability to a basic model or an extension model. Also, the extension model may be designated with further detail. The model selection can be set upon purchasing the printer. Otherwise, after purchase, operation capability designation information can be set to the printer. Meanwhile, the content of setting can be modified later.

Besides these, it is possible to combine quantitative designation and qualitative designation together. For example, to the basic model and the extension model, quantitative designations can be added, respectively. In this case, the user can carry out printing with the operation capability designated by each model within the designated quantitative limit. For example, designation is made on a qualitative operation capability suited for text printing which an operation capability great in quantity is designated. On the other hand, qualitative operation capability is designated so as to be able to print a photograph for present, while operation capability small in quantity is designated. This makes it possible to meet the requirements by various users, such as a user who usually carries out text printing in almost cases but rarely prints photograph images.

FIG. 12 to FIG. 15 shows an example of a procedure for receiving operation capability designation. The procedure for receiving operation capability designation, in the present embodiment, is carried out on-line using the computer 40 through the Internet. This is, of course, not limitative. The procedure program can be provided in a form of a recording medium which stores it together with a printer driver. Also, this may be obtained by downloading from a Web site of a printer maker.

Figure 12:
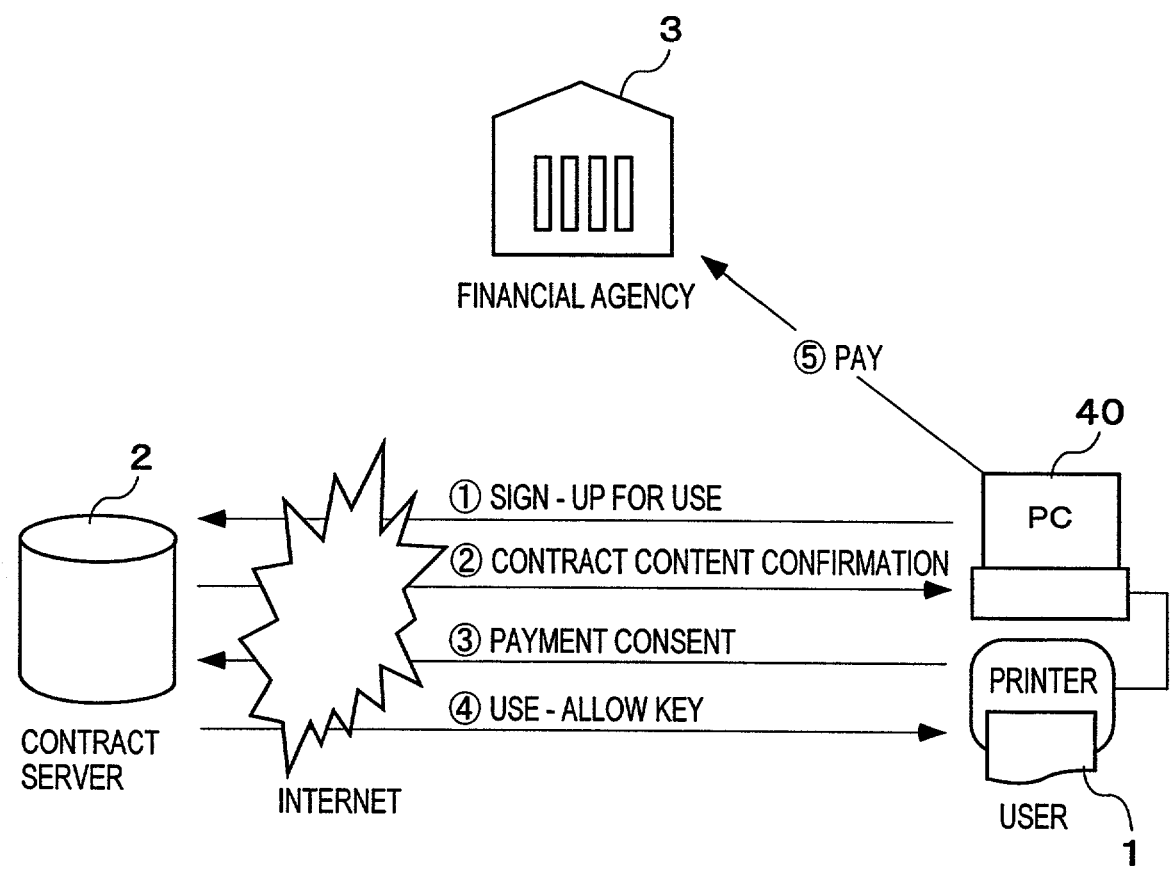
FIG. 12 is an explanatory view showing an example that the contract on operation-capability setting is made to a contract server through the Internet.
Figure 13:
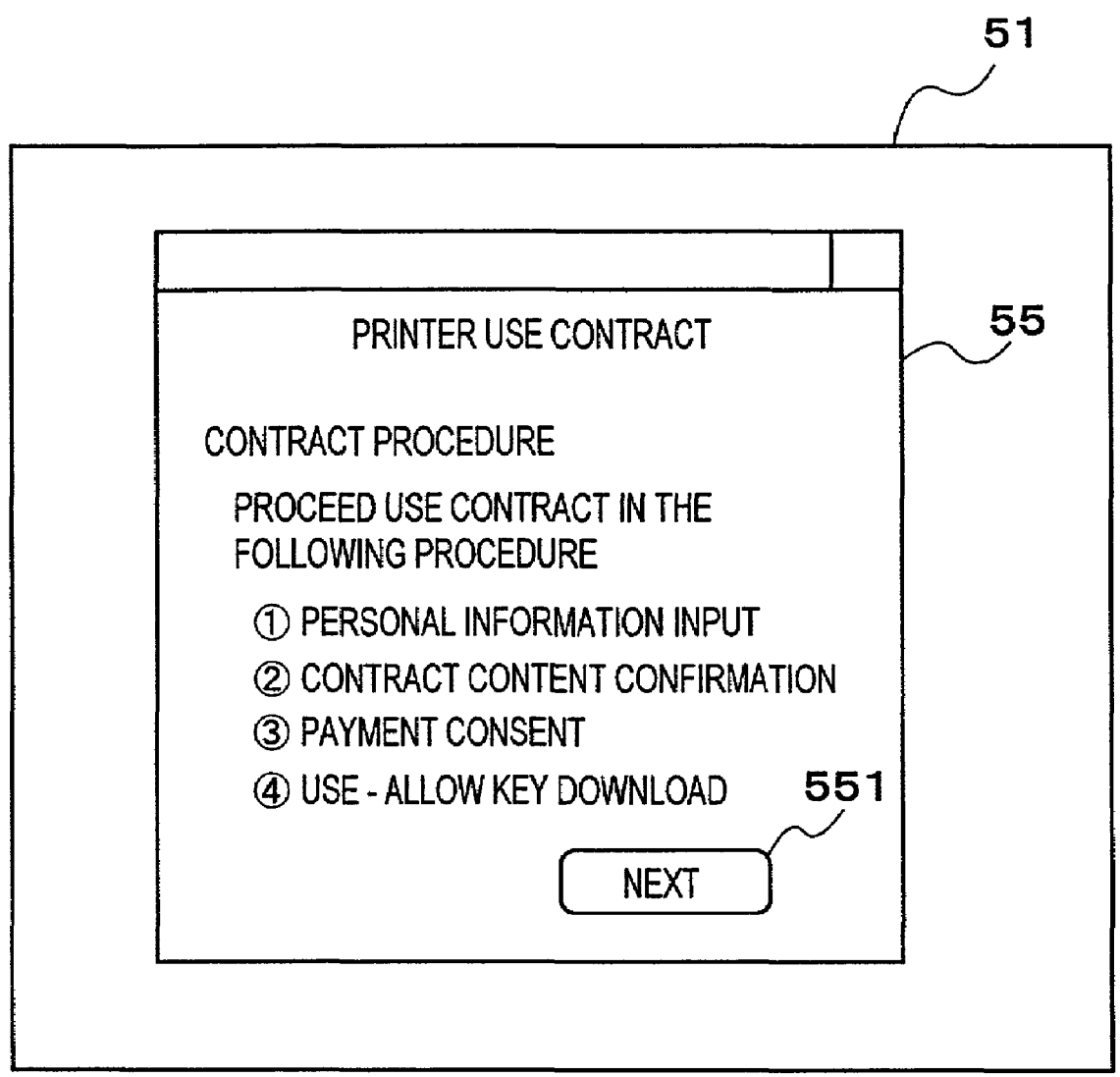
FIG. 13 is an explanatory view showing a display screen example to show a procedure upon making a use contract to the contract server.

FIG. 12 shows an example of a procedure for receiving operation capability designation. Herein, explanation is made on the example of a use contract in the case that a printer is purchased and used for the first time. Of course, only operation capability may be designated instead of the use contract. In this case, operation capability designating will be signed up instead of sign-up for use.

This procedure is carried out by connecting between the computer 40 of a user, a server 2 for making a contract and a financial-agency system 3 for making settlement, through the Internet.

The user makes a sign-up for use to the contract server 2 through a sign-up program provided on the computer 40. The input windows 55, 56 and 57 to be used in this case are shown in the display screen 51 shown in FIG. 13 to FIG. 14. Herein, displayed is a screen 55 (see FIG. 13) explaining the outline of a printer use-contract procedure. Thereafter, clicking of NEXT button 551 is accepted to enter a procedure for inputting personal information for the use contract.

In FIG. 14, displayed is a screen 56 for inputting personal information required for making the use contract Displayed herein are the information 561 identifying the user, the information 562 certifying payment, TRANSMIT button 563 and CANCEL button 564. The boxes for inputting name, address, telephone number, etc. are displayed as the user-identifying information 561. Also, the boxes for inputting a credit-card issuance company name, number, valid term, etc. are displayed as the payment certifying information. The user inputs required matters in these boxes through a not-shown keyboard or the like. In the case of no cancellation, the TRANSMIT button 563 is clicked. The computer 40 accepts this and transmits the sign-up for use to the contract server 2.

Figure 15:
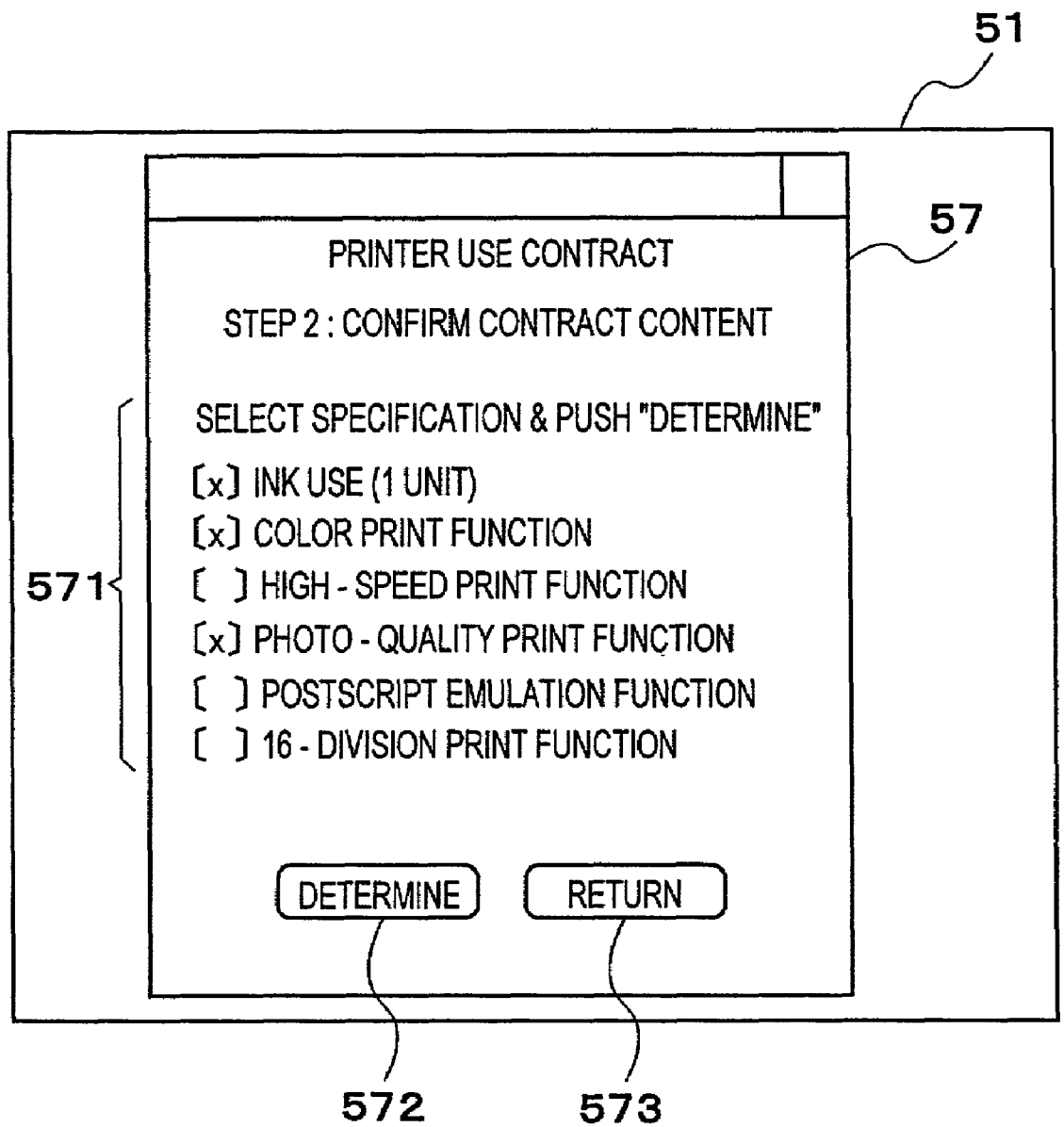
FIG. 15 is an explanatory view showing a display screen example for contract content confirmation upon making a use contract to the contract server.

The contract server 2 forwards to the user computer 40 the display content for contract-content confirmation and the inputted data to be accepted. The computer 40 receives this and displays it on a display monitor 50. FIG. 15 is a screen to be displayed in such a case, i.e. a screen for confirming the contract content.

The user designates an operation capability, i.e. makes setting of use and setting of a use limit, through the screen 57 shown in FIG. 15. In FIG. 15, displayed are an operation capability setting region 571, DETERMINE button 572 and RETURN button 573.

The example of FIG. 15 shows an alternative of INK USE (1 UNIT) as a use limit, in respect of a quantitative operation capability. Herein, it may be set that 1 unit indicates, for example, an ink amount of 50% of one ink cartridge. This unit, of course, can be optionally designated. For example, it is possible to set, 1 unit, as 10% of one ink cartridge. Otherwise, the amount of one ink cartridge may be set as 1 unit Meanwhile, the example of FIG. 15 is not to show an alternative of basic and extension modes, in selecting a qualitative operation capability. The items corresponding to those included in an extension model setting are displayed as qualitative alternatives. Namely, in the case that no selection is made for a qualitative operation capability, it is constituted such that the basic model is selected. Of course, the example shown herein is one example, and hence the invention is not limited to this.

The user, after checking required alternatives, clicks DETERMINE button 572 except for the case to click RETURN button 573. The computer 40 accepts this and displays a screen 58 shown in FIG. 16.

Figure 16:
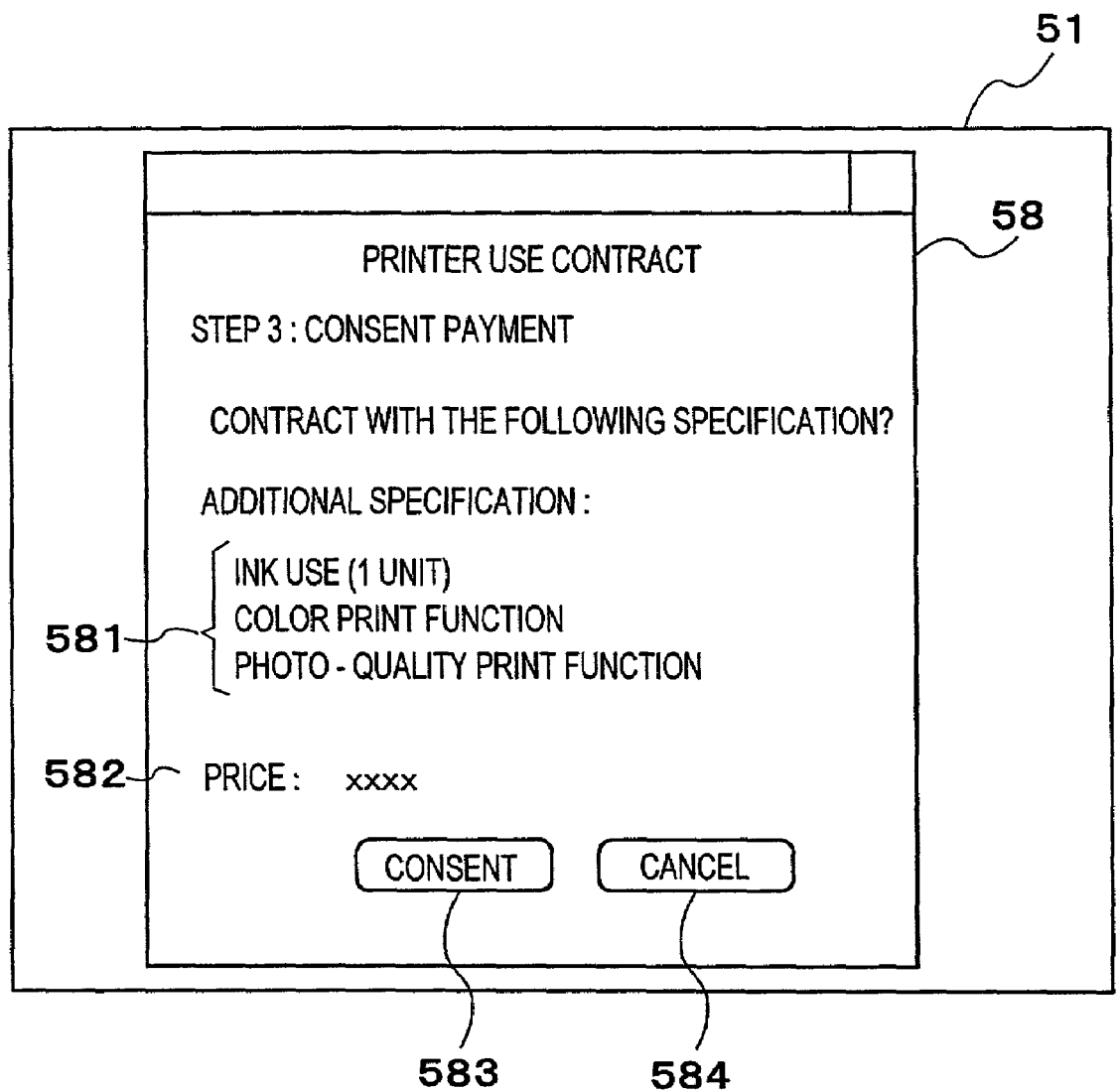
FIG. 16 is an explanatory view showing a display screen example for the consent of payment upon making a use contract to the contract server.

The screen 58 shown in FIG. 16 is a screen to pursue a procedure for payment consent. Herein, displayed for the user are a list 581 for additional use, CONSENT button 583 to seek a confirmation of consent on payment, price 582 indicating representative of a price xxxx for a designated operation capability and CANCEL button 584. The user is allowed to confirm the displayed content and click CONSENT button 583 except for the case of cancellation. The computer 40 accept this and transmit the data including the input content to the contract server 2.

Figure 17:
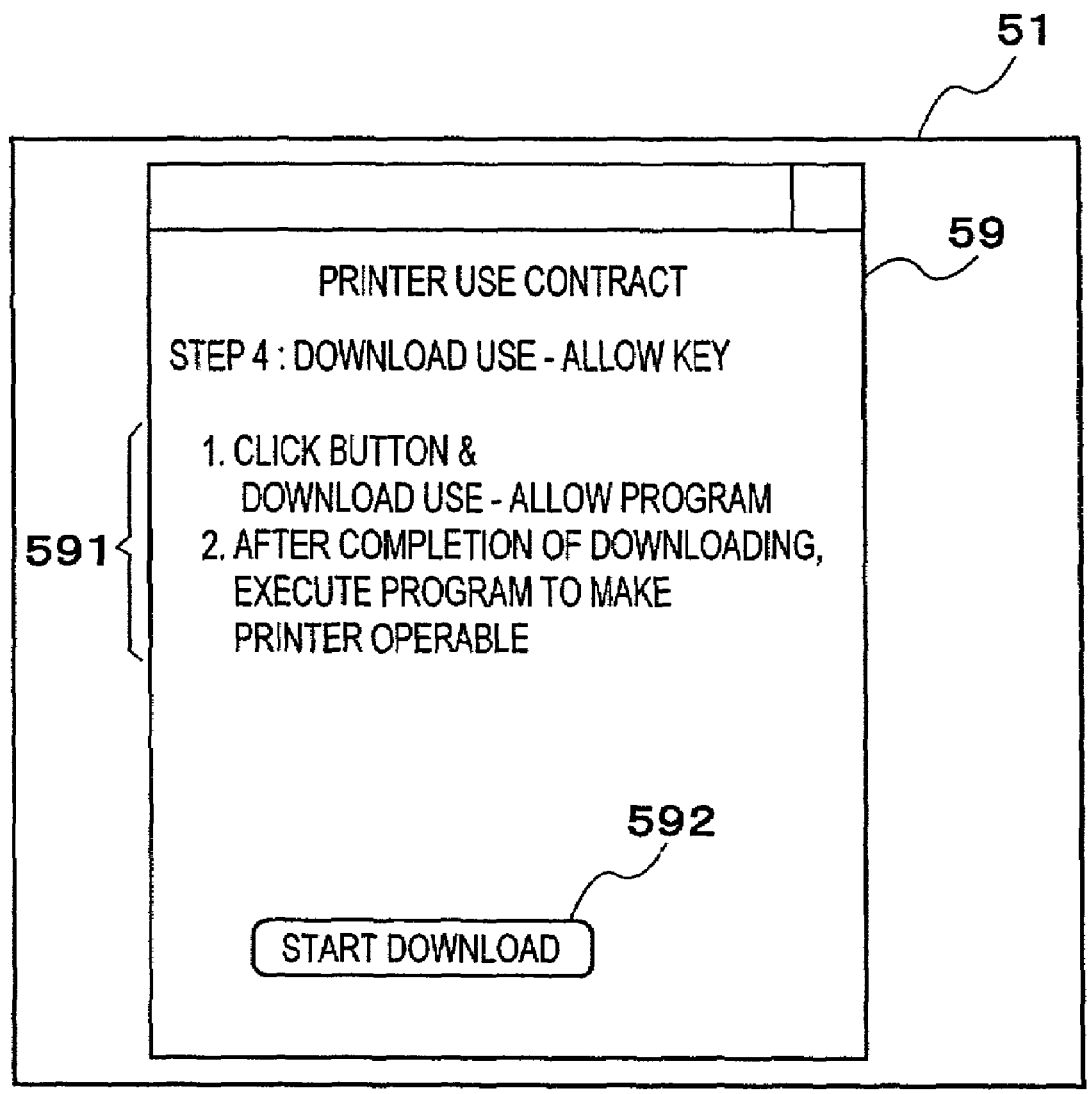
FIG. 17 is an explanatory view showing a display screen example to show a procedure of downloading a use-allow key upon making a use contract to the contract server.

The contract server 2 receives the data and transmits, to the computer 40, the URL of a server to which a permission key is to be downloaded and the information representative of a message that download is to be made (see FIG. 17). FIG. 17 is a screen for downloading a permission key.

The computer 40 displays the transmitted information, as a screen shown in FIG. 17, on the display monitor 50. On this screen 59, displayed are a message showing that download is to be made and a button 592 to start download.

When the user clicks DOWNLOAD START button 592, the computer 40 accepts it and accesses a relevant server by the use of a provided URL, thereby downloading a use-permission program. Thereafter, the computer 40 forwards the downloaded use-permission program to the print controller 30. The use-permission program includes operation capability designation information for designating an operation capability as in the foregoing and a program 3223 for realizing the function to set the operation capability as in the foregoing. Note that, as in the foregoing, the program 3223 itself for realizing an operation capability setting function may be included in place of a program for starting up the program 3223.

The above is the example that a procedure is made to accept a designation of an operation capability through the Internet. The present invention is not limited to this. With another method, it is also possible to acquire operation capability designation information and set it onto the printer, as in the following.

Figure 5:
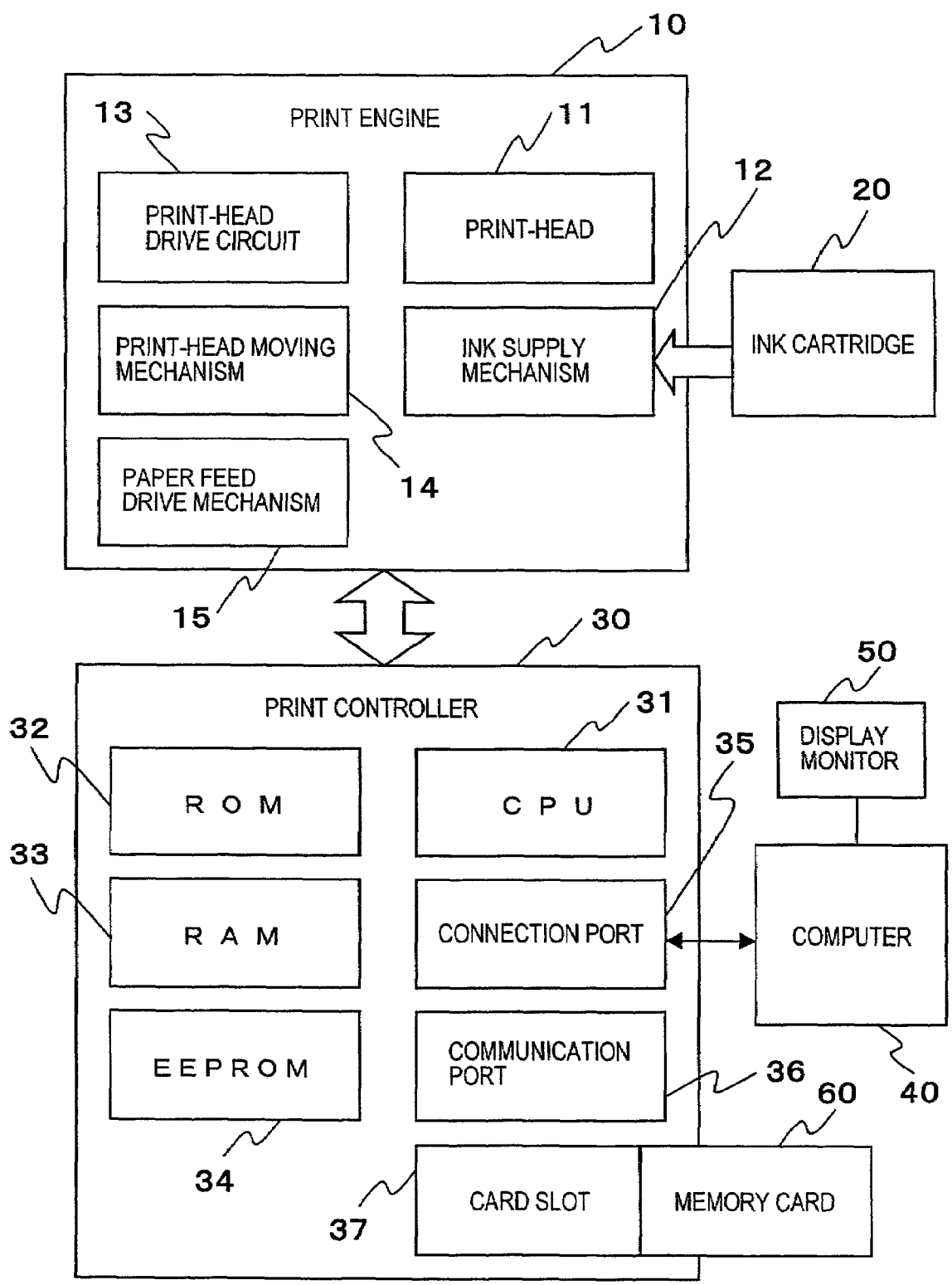
FIG. 5 is a block diagram showing a configuration having a card slot for a memory card added to the first-embodiment image forming apparatus.

For example, operation capability designation information can be set to the printer by the use of a recording medium such as a memory card. Namely, as shown in FIG. 5, a memory card 60 recording the operation capability designation information for designating an operation capability is mounted in a card slot 37 of the printer, to allow the print controller 30 to read the operation capability designation information recorded in the memory card 60 whereby the operation capability can be designated. Note that, in this case, together recorded is a program for starting up the program 3223 to realize the operation capability designation function. Accordingly, the startup program is first read to start up the program 3223 thereby storing the operation capability designation information to the EEPROM 34. The designation of operation capability is made by storing the operation capability designation information to the EEPROM 34. Note that the program 3223 for realizing an operation capability designation function as it is may be provided instead of the startup program.

By thus designating an operation capability by the use of a memory card 60, the printer maker can collect the payment for the printer in a particular use state, as a price of the memory card 60. On the other hand, the user can set an operation capability of the printer by purchasing a memory card even where the procedure is impossible through the Internet.

Incidentally, where using a memory card, the operation capability designation information can be read out and thereafter writing be made to erase the content in order to make double use of the recorded operation capability designation information impossible.

Figure 6:
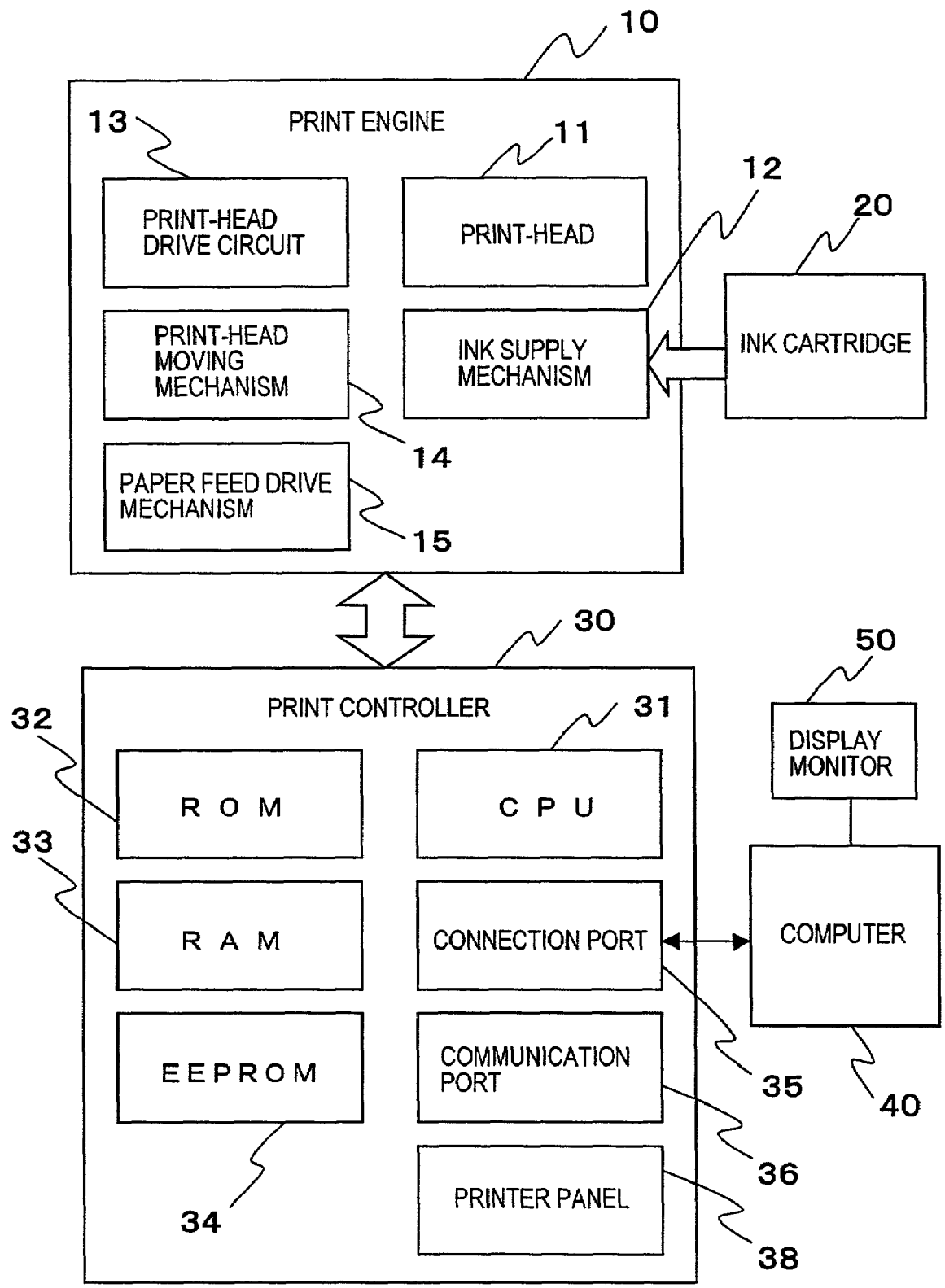
FIG. 6 is a block diagram showing a configuration having a printer panel added to the first-embodiment image forming apparatus.

Next, the operation capability designation information can be manually inputted to the printer from either the printer panel 38 shown in FIG. 6 or computer 40. In the case of manually inputting the operation capability designation information, the operation capability designation information is provided as encrypted information so that a decryption key can be delivered to a registered user so that the user can use the manually-inputted operation capability designation information. In also this case, inputted together is the program 3223 for realizing the foregoing operation capability designation function or the program for starting up the same. Also, in this case, the designated operation capability can be prevented from being doubly used by limiting the input to only once on one printer. In the case of panel input as in the present embodiment, there is a merit that an especial medium is not required. However, labor and time is spent upon input.

Figure 7:
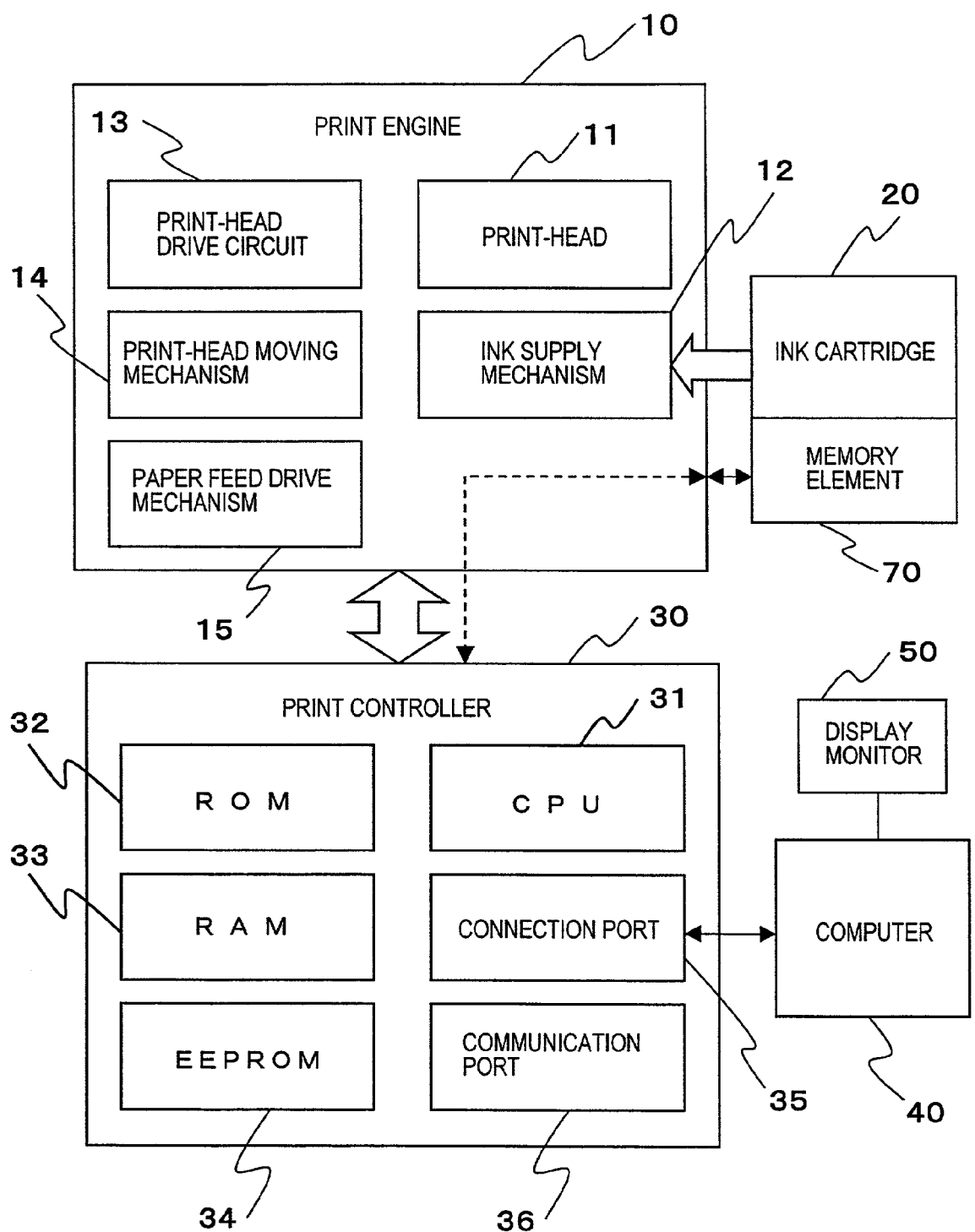
FIG. 7 is a block diagram showing a configuration having a memory element provided on the ink cartridge used in the first-embodiment image forming apparatus.

Next, it is possible to store operation capability designation information in a memory element 70 attached to the ink cartridge 20 shown in FIG. 7. The memory element 70 is connected to a not-shown connector while the ink cartridge 20 is loaded in the print engine 10. The connector is connected to the print controller 30 through a not-shown interface. Consequently, the memory element 70 is allowed to transmit and receive data to and from the CPU 31 of the print controller 30. The storage of operation capability designation information to the EEPROM 34 can be implemented similarly to the foregoing memory card. Hence, the explanation is not repeated herein. In this case, by purchasing an ink cartridge set with desired operation capability designation information, the operation capability designation information can be set up similarly to the foregoing case with the memory card. However, where it is not designated to use all the ink and it is desired to use the residual ink, there is a need to reset the operation capability designation information by the foregoing other method. Note that the designation of an operation capability by the use of an ink-cartridge memory element will be explained in more detail in another embodiment as mentioned below.

Next, explanation will be made on utilization status information. In the present embodiment, the utilization status information 342 shown in FIG. 3 is set with respect to the information representative of charge in quantity. Consequently, substantially stored is the use-status information 3421 corresponding to use-limit information. The use-status information is updated with the newest information.

When the use-status information, is directed to ink usage, it can be determined by calculating an ink ejection amount of respective color inks depending on the dot diameter and the number of pixels in the print data printed. Also, when it is directed to the ink remaining amount, it can be determined by subtracting the calculated ink usage from the current ink remaining amount. Alternatively, the use status information can be determined by the measurement of the utilization status with a sensor.

Figure 8:
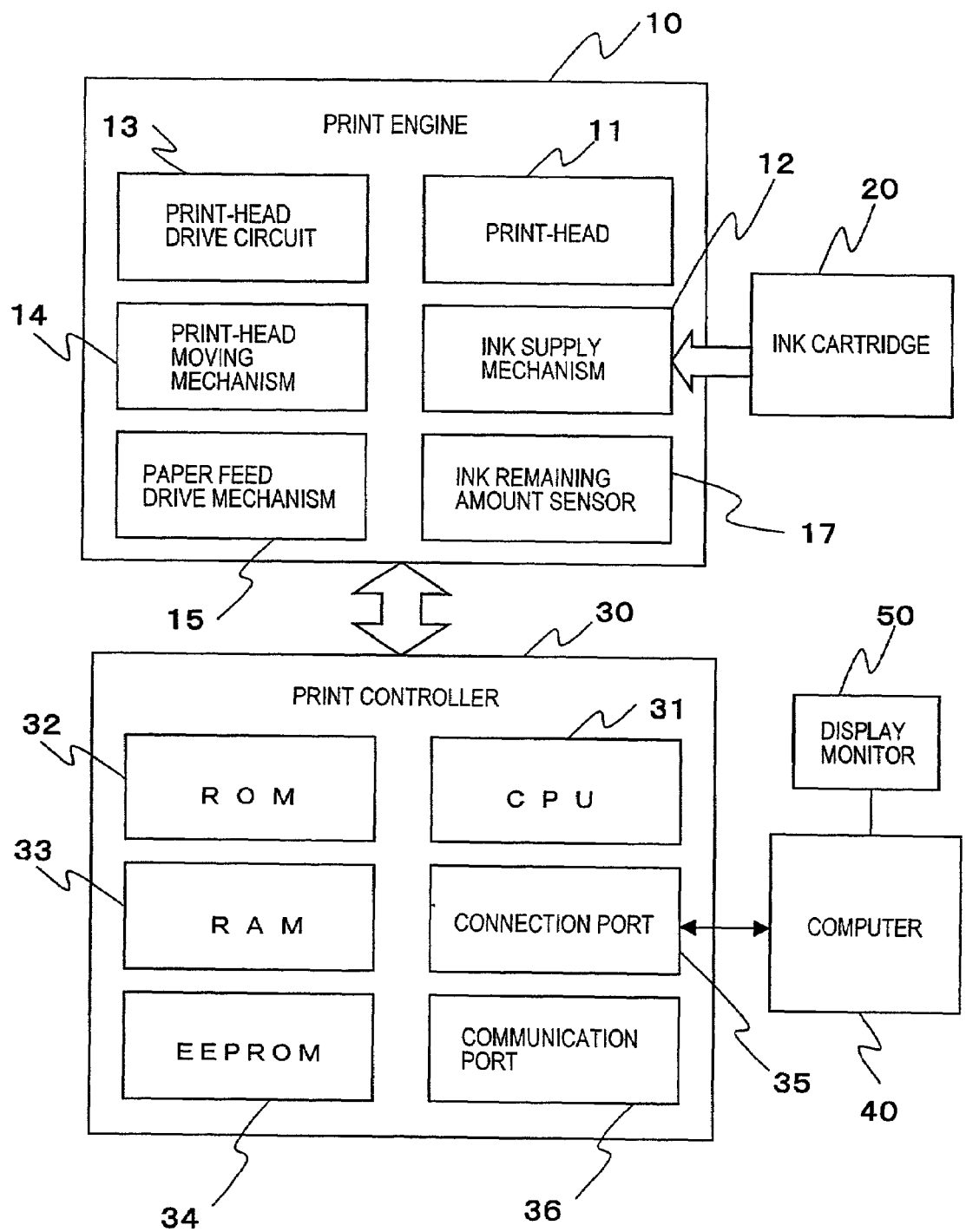
FIG. 8 is a block diagram showing a configuration having a memory element provided on the ink cartridge used an ink remaining-amount sensor in the first-embodiment image forming apparatus.

The example of determining a use status due to measurement using a sensor includes a case where an ink remaining amount is measured with a sensor. In this case, as shown in FIG. 8 an ink remaining-amount sensor 17 is provided in the print engine 10. The detection of a remaining amount with the ink remaining amount sensor 17 includes, for example, detection of an ink remaining amount with an optical sensor, measurement of a cartridge weight with a strain gauge or the like, and so on. The ink remaining amount sensor 17 can be attached, for example, to the ink cartridge. The output from the ink remaining amount sensor 17 is taken in by the CPU 31 of the print controller 30 and stored to the EEPROM 34.

Figure 9:
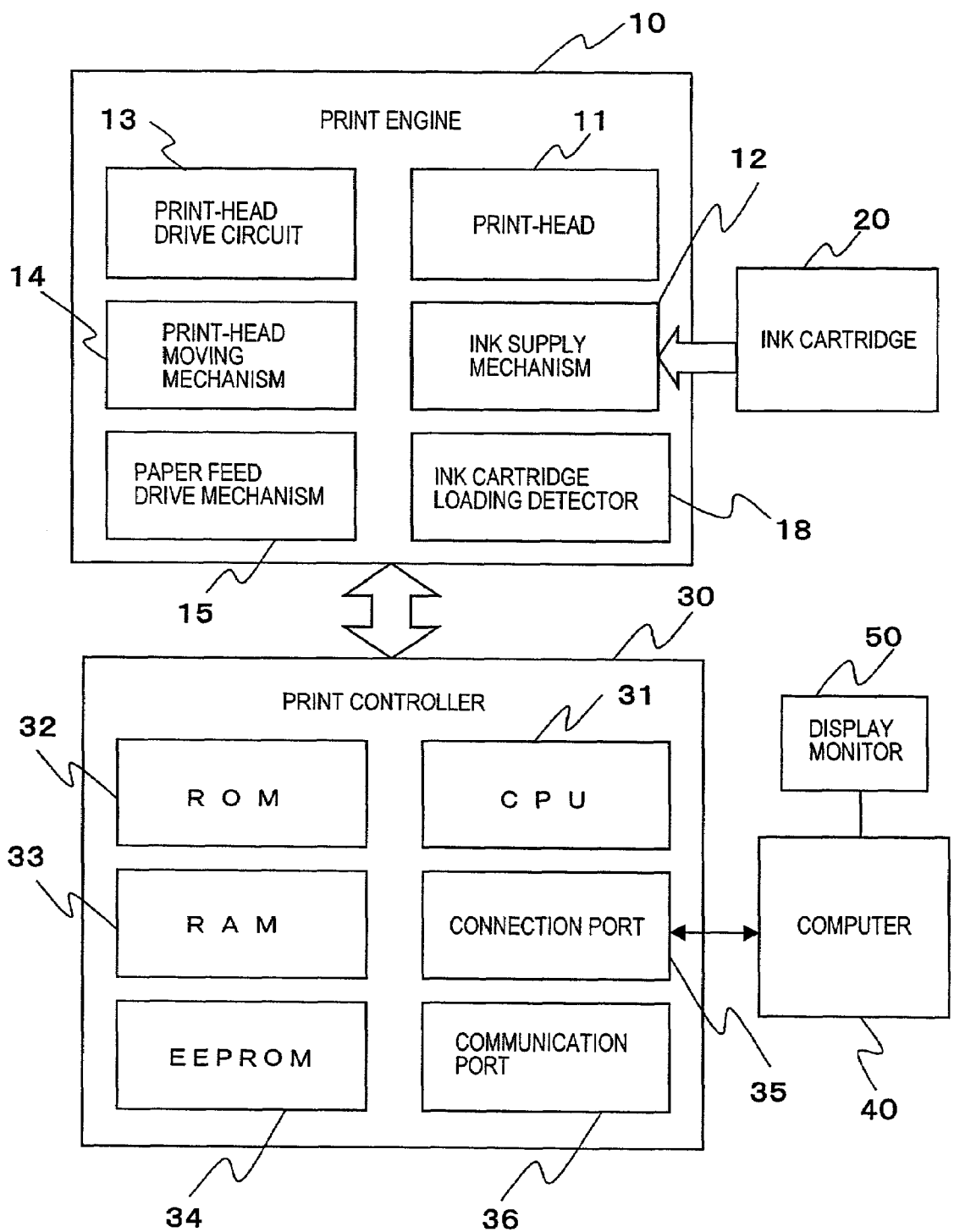
FIG. 9 is a block diagram showing a configuration having a memory element provided on the ink cartridge used in the first-embodiment image forming apparatus.

Meanwhile, another example of determining a utilization status due to measurement using a sensor includes an example where the number of ink cartridges to be used is counted. In this case, there is provided with a configuration as shown in FIG. 9. Namely, an ink-cartridge-loading detector 18 is provided in the print engine 10 to provide a configuration in which counting is carried out each time of loading the ink cartridge 20. As the ink cartridge-loading detector 18, for example, a limit switch is provided which detects the loading of the ink cartridge due to turning-on thereof. A counter for counting the signals representative of such turning-on is provided in the EEPROM 34, to thereby detect the number of times of loading of the ink cartridge 20. In this case, it is premised that the ink cartridge once loaded be not detached until depleted.

Next, explanation will be made on the computer 40 to which the printer is connected. A display monitor 50 is connected to the computer 40. Various screens are displayed, as required, on the display monitor 50 through the computer 40. Displayed is a screen for making a use contract as in the foregoing, a screen for making setting, or the like.

For example, as shown in FIG. 10, on the display screen 51 is displayed a printer status window 52 showing a utilization status of the printer. In the window 52, for example, INK 521, PAPER 522 and ERROR 523 are prepared, as the alternative in the window,. In the INK 521, shown is one of utilization-status displays. Namely, ink remaining amount display region 5211 is provided therein to show ink remaining amounts of black ink and color ink. Meanwhile, in this window, there are displayed a button 5214 for instructing usage setting and a button 5215 for approving the current state. These, if clicked by a mouse pointer or the like, cause instruction for the corresponding operation.

The ink remaining amount in the ink remaining amount display region 5211, in the present embodiment, is indicated in volume percentage. Use-limit indications 5212 and 5213 are shown with lines. Of course, this is not limitative. For example, they may be indicated by colors. The use-limit indication relatively shows an indication in the ink remaining amount indication 5211 depending on inherent limit information as mentioned below. FIG. 10 shows an example that the use limit is set at 50% of the initial ink amount. Meanwhile, this indication can be omitted. Furthermore, where the use limit is at 100% of the initial ink amount, the indication may be omitted. Due to this indication, the use limit is indicated separately from the ink remaining amount, thus providing the user with a measure as to how long he or she can use the ink from now on. Namely, where ink remains when the indication has reached the use limit, resetting of use limit makes it possible to press on with printing without exchange of ink. On the other hand, where it reaches the inherent limit, the ink cartridge has to be exchanged because of no remaining ink.

Meanwhile, the ink remaining amount indication 5211 can be displayed using a use limit as a reference. In this case, for example, even if the use limit is set at 50% of the inherent limit, the ink remaining amount indication 5211 is indicated as the use limit being set at 100%.

Furthermore, although not shown in FIG. 10, a message can be displayed to ask for resetting of the use limit where reaching the use limit. Due to this, the user is allowed to know the necessity of resetting of the use limit. Also, where there is no ink remaining amount, a message is displayed that ink is to be exchanged.

Figure 4:
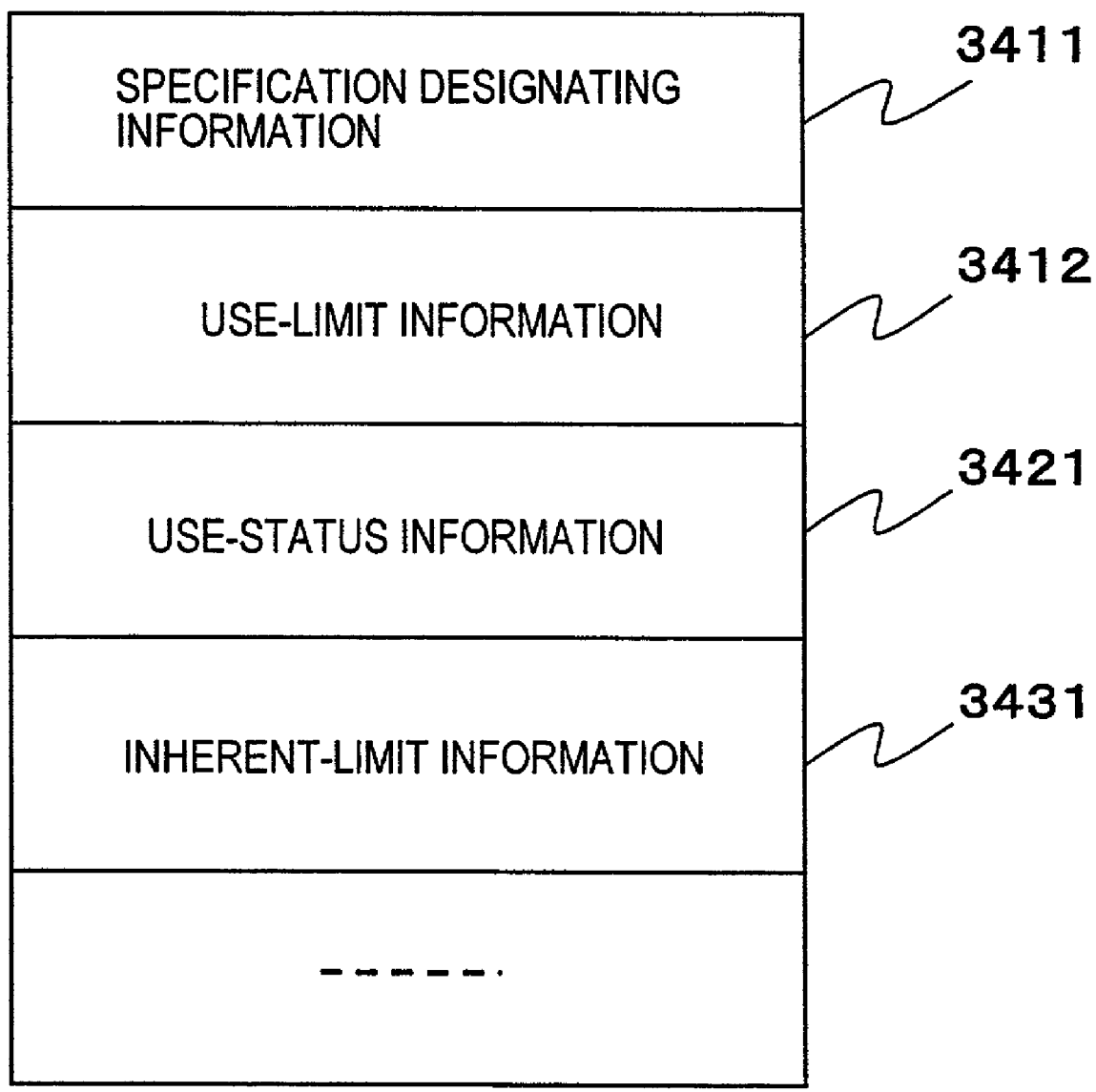
FIG. 4 is an explanatory view showing one example of a storage content in a non-volatile memory of a print controller storing the information representative of a use limit of the printer.

Next, explanation will be further made on the utilization of the printer to which the invention is applied. Herein, description is made narrowing to the setting of the use limit in order to simplify the explanation. It is needless to say that the qualitative operation capability can be designated in a manner described before. In the below example, explanation will be made on a full specification state wherein all of the items on an extension model are selected. Accordingly, the present embodiment is not restricted in quality. As shown in FIG. 4, stored in the EEPROM 34 are specification designation information 3411 and use limit information 3412 as operation capability designation information; use status information 3421 as utilization status information; and inherent limit information 3431 as inherent capability information. Herein, where the inherent limit information 3431 is, for example, the ink amount stored is the initial amount of ink filled in the cartridge, i.e. the information corresponding to an ink amount of 100%. This information is used as a reference amount when indicating a status of the printer, for example.

The use limit information includes, for example, the number of ink cartridges which have been used, ink usage, ink remaining amount and the information designating a limit due to the number of print pixels or the like. The use limit information can be provided in various forms as:

a) previously written in the EEPROM 34 upon factory shipment b) externally written after shipment instead of previous writing c) writing minimally required use limit information in such an extent that trial printing can be made upon factory shipment while externally setting up use limit information in the case of usual utilization.

In the case of a), the printer can be used in a certain quantity, and when reaching the use limit, the user is allowed to select whether to replace a printer itself by purchase or reset the use limit. Consequently, this can be considered that this resembles the ways of the conventional printers. However, there is apparent difference from the conventional printers in that there has a use limit. In the case of b), it is impossible to use by merely obtaining a printer. There is a need to acquire the information for setting a use limit, to set up it on the printer. In this case, by setting the use limit in accordance with ones own required amount, the price can be placed in a quantity-dependent system, that being reasonable. In the case of c), the price is basically in a quantity-dependent system as similar to the case of b). However, printer connection setting up and test printing can at least be conducted, that being friendly for a printer purchaser.

The use limit of a printer after factory shipment can be set up in the following methods:

(1) taking in use limit information through the computer to which the printer is connected (FIG. 1)

(2) taking in use limit information written on a recording medium such as a memory card (FIG. 5)

(3) taking in use limit information manually inputted from the printer panel (FIG. 6)

(4) taking in use limit information from a memory element attached to an ink cartridge (FIG. 7).

Although those in the above are representative methods, the invention is not limited to them. The above methods were already described and hence they being not repeated herein. Meanwhile, the taking of use limit information from a memory element in the foregoing (4) will be explained in detail in another embodiment as mentioned below.

Explanation will be made below on operation capability designating processing within the print controller 30, with reference to FIGS. 18 and 19. This processing is realized by executing the program 3223 for realizing an operation capability designation function by the CPU 31 as described before.

Figure 18:
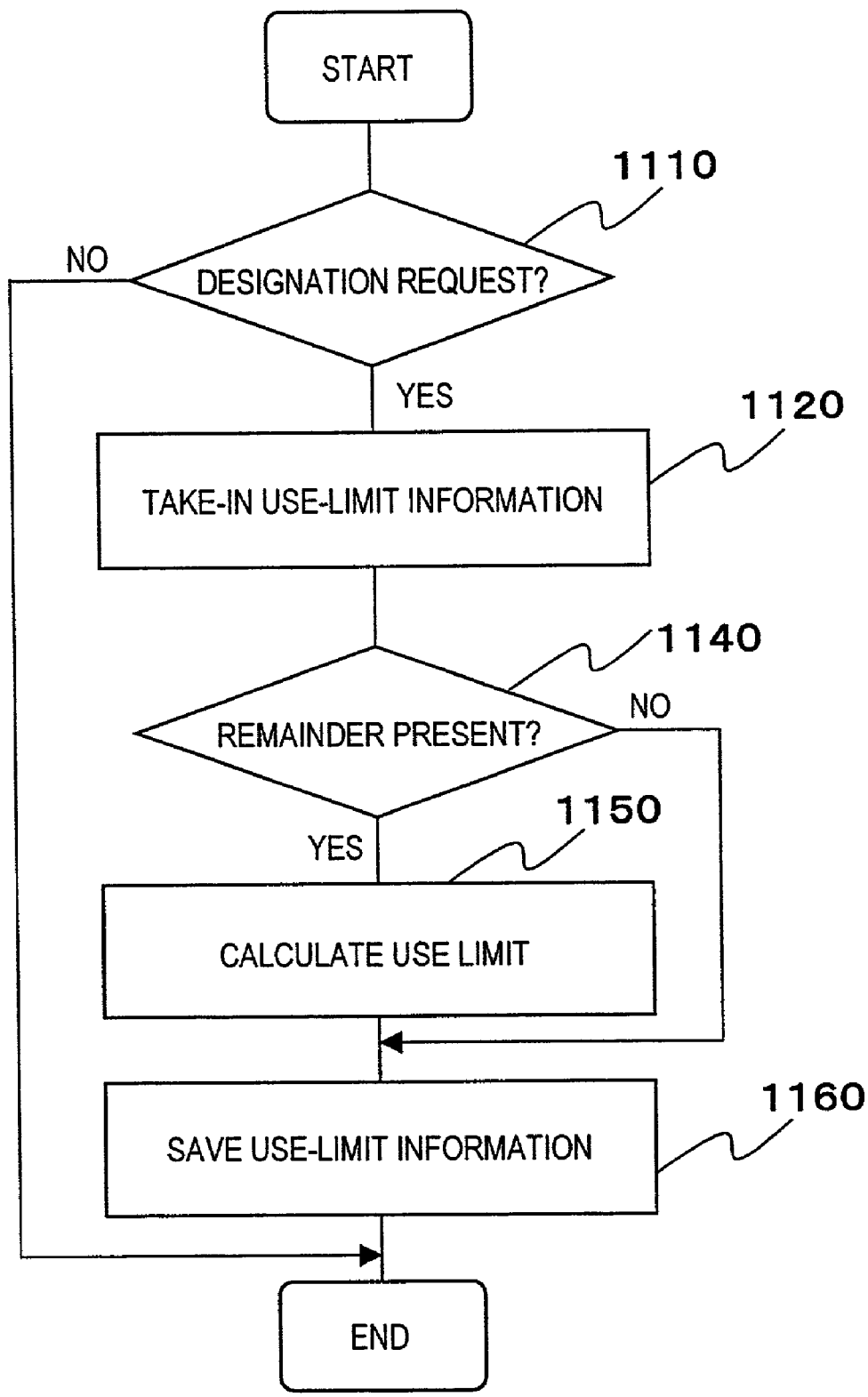
FIG. 18 is a flowchart showing a procedure to set operation capability designation information to the printer.

As shown in FIG. 18, the CPU 31 examines whether an operation-capability designation is requested, to start designating processing where designation is requested (step 1110). The designation request includes, as described before, a request from the computer 40, a request due to a loading-detection signal for detecting loading of a memory card 60 to a card slot 37, a request due to the input from the panel 38 and so on. In any cases, the CPU 31 reads therein a program for starting up the program 3223 which realizes the above-mentioned operation-capability setting function, thereby starting up the program 3223. Thereafter, the program 3223 is executed to carry out setting processing.

First, the CPU 31 takes in use-limit information 1160 (step 1120). Namely, the use-limit information taken in is once saved in the RAM 33. Thereafter, whether there is remaining amount by reaching the use limit is examined (step 1140). This is attained by examining a remaining amount, for example, by the use of the use-limit information 3421 and use-status information 3412 stored in the EEPROM 34. Herein, where there is a remaining amount, the remaining amount is added to the taken-in use limit to determine a new use limit (step 1150). Where there is no remaining amount as in the case of newly setting a use limit, no addition or addition of 0 is made. Then, the determined use limit is stored as the use-limit information 3412 in the EEPROM 34 (step 1160).

Note that, although explanation is omitted herein, where there is new setting up of specification, the storage of designation specification information 3411 is also processed.

Figure 19:
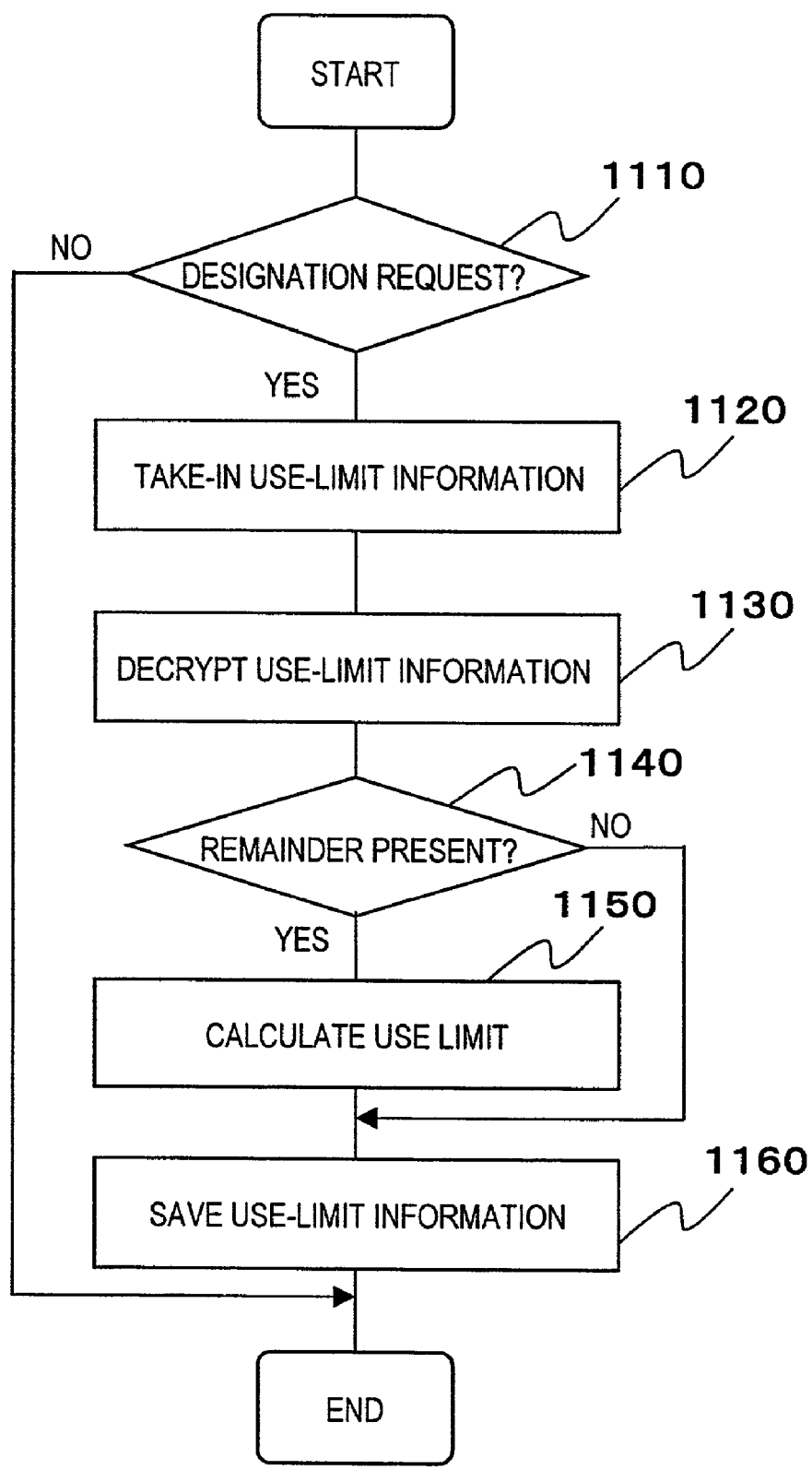
FIG. 19 is a flowchart showing another procedure to set operation capability designation information to the printer.

Meanwhile, where the use limit information is encrypted, a decryption process as shown in FIG. 19 is added (step 1130).

Next, explanation will be made on the operation of the invention in the case where printing is carried out with a printer, with reference to FIG. 20.

Figure 20:
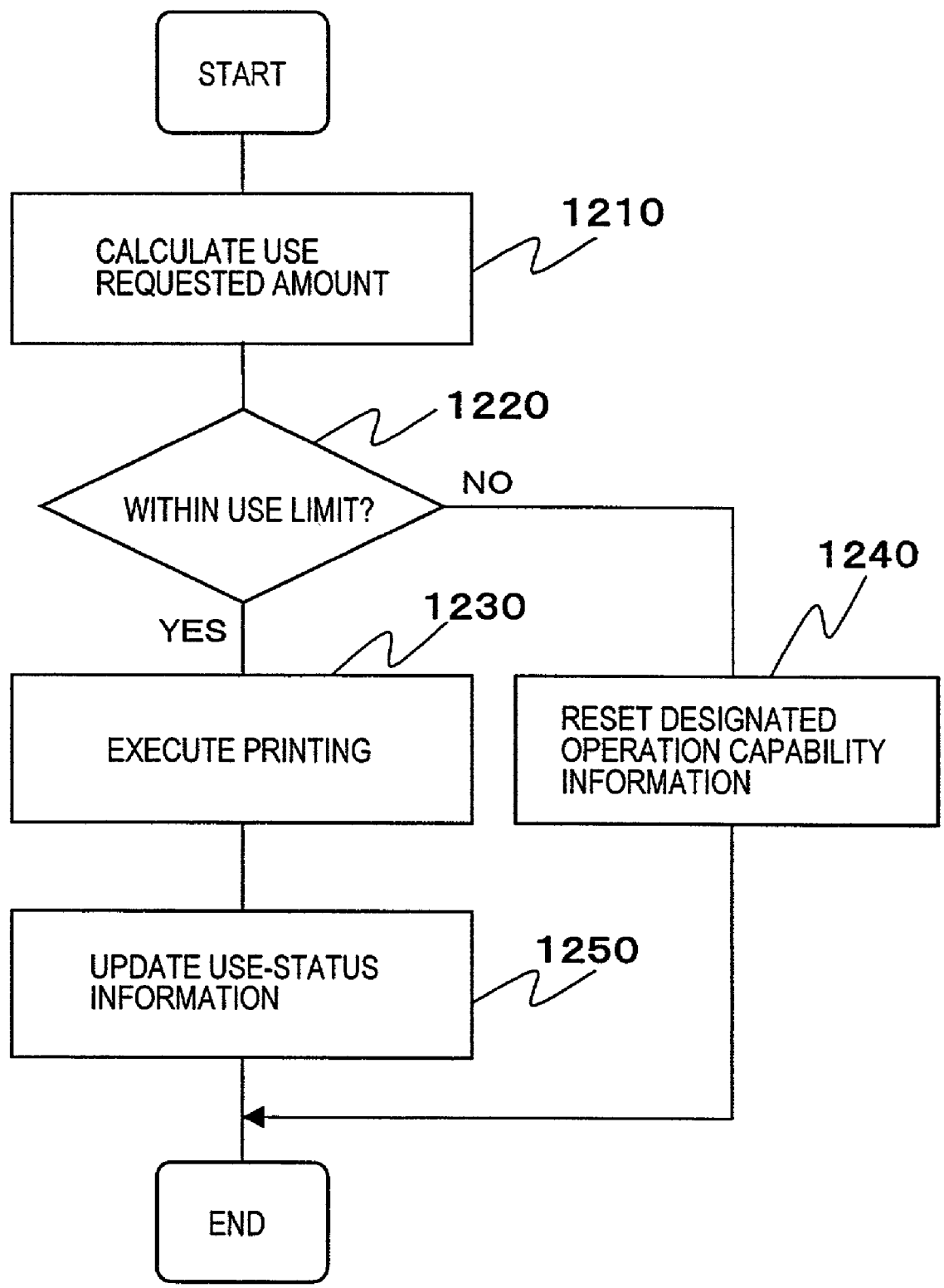
FIG. 20 is a flowchart showing a procedure to accept print data and determine whether print is possible within the range of a designated operation capability in the printer.

As shown in FIG. 20, the CPU 31 receives the print data forwarded from the computer 40 and calculates a use-request amount, i.e. ink usage, depending upon the print data (step 1210). The ink usage can be determined by calculating an ejection amount of ink based on the dot diameter and the number of pixels of each color of ink for the print data.

Next, it is examined whether the printing request can be performed within the use limit (step 1220). For example, this is carried out as in the following. First, the ink usage determined in the above step is added to the so-far ink usage stored as use-status information 3421, thereby determining a prediction value of cumulative ink usage. If the prediction value is smaller than the use limit stored in the use-limit information 3412, it is determined that printing is possible and the instruction of printer execution is made to the printing operation control program 321 (step 1230). On the other hand, when the prediction value is greater than the use limit, it is determined that print is impossible, to notify that to the computer 40 (step 1240). Incidentally, the computer 40 receives that and displays a message that the operation-capability designation information is to be reset, on the display monitor 50.

After print execution, the use-status information is updated (step 1250). This can be carried out by storing this value as new use-status information 3421 with the foregoing prediction value in the EEPROM 34. Also, this can be determined by using a sensor measurement value, as stated before.

In the above-described example, the operation-capability designation information and the utilization-status information are stored in the EEPROM 34. The invention is not limited to this. For example, there is provided a structure in which these information are stored in a memory element 70 attached to the ink cartridge 20. In this case, it is possible to continue the utilization by detaching the ink cartridge 20 and attaching it to the printer mounted with a print controller 30 having the similar function.

As described above, according to the present embodiment, printer price can be placed in a quantity-dependent system based on a use contract and hence a price can be set, which is matched to user's utilization form. For example, there bay be provided a constitution in which the printer main body is provided at extremely low price and an additional fee is charged in accordance with the utilization form. By doing so, the user who carries out a small quantity of printing by using a part of performance of a high-performance printer is allowed to obtain a high-performance printer at low price and can set the fee for utilization of the same at a low price, it being possible to utilize a printer totally at a low price. On the other hand, a maker, while mass-producing less kinds of high-performance printers, is allowed to properly collect frees while satisfying the user's individual demand.

Consequently, according to respective embodiments of the invention, an image forming apparatus can be operated in a mode matched to a utilization form of the user. Moreover, for the same image forming apparatuses, fee collection can be matched to the utilization form of individual user thus allowing user-friendly price setting.

For example, for the user who mainly carries out text printing only, it is possible to set a price in accordance with a specification, as a standard, in which monochromatic printing or printing adding therewith a plurality of colors is performed. For example, it can be considered to provide the price setting for the foregoing basic model. On the other hand, for the user who carries out color printing pursuing high resolution and delicate hue, e.g. photographic picture print, it is possible to set a price for performing such printing as a standard. For example, it can be considered to provide the price setting for the foregoing extension model.

This is true for utilization frequency. For example, setting can be made such that a quantitative limitation in conformity with the use frequency is added for the users who print infrequently while no quantitative limitation is added for the users who print frequently and other users. With such quantity-dependent fee, it is possible to set a reasonable price to the respective users who use a printer in a variety of utilization forms. Namely, according to the present invention, it is possible to collect fee for an image forming apparatus in conformity with the operation capability thereof.

Next, explanation is made on an embodiment in which the invention is applied for providing a recording material used in an image forming apparatus for visibly fixing the computer-handled image data on a paper.

In the below embodiment, a recording material is contained in a container and a recording material unit to which a storage device is attached, is used. Also, in the below embodiment, the recording material unit can be used only after it comes into a state that the use allowable amount of the recording material is written to the storage device. Therefore, when the image forming apparatus uses the recording material unit, the driver of the image forming apparatus refers to the use allowable amount information stored in the storage device, and the driver controls the image forming apparatus such that image forming operation is performed within a range of the use allowable amount.

Herein, the use allowable amount is one kind of quantitative designations of operation capability. Note that, in the below embodiment, the information representative of a qualitative designation of operation capability as mentioned above can be stored together therewith or alone in the storage device. Because the qualitative designation was already described, explanation is made below on quantitative designation, i.e. use allowable amount.

The below embodiment explains on an example, as a recording material unit, of an ink cartridge containing ink. The invention is not limited to this but can be applied for providing toner, for example.

Figure 24:
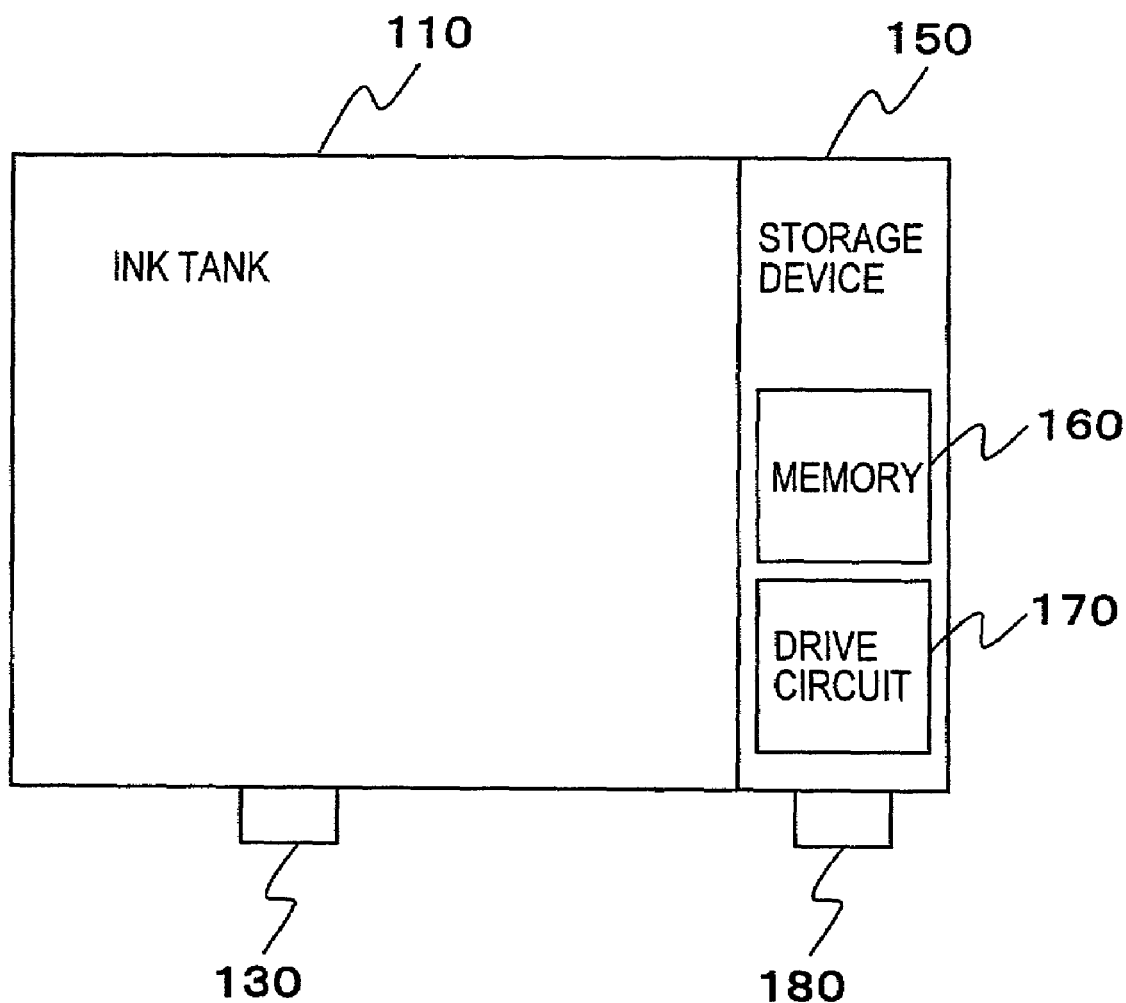
FIG. 24 is an explanatory view showing one example of an ink cartridge usable in providing of a recording material in the invention.

An ink cartridge 100 has, for example, an ink tank 110 serving as a container for containing ink and a storage device 150 attached thereto, as shown in FIG. 24. The ink tank 110 contains a certain amount of ink. Also, this ink tank 110 is provided with an ink ejection part 130 which communicates with an ink duct in the printer when mounted on the printer. The storage device 150 has a data writable readable nonvolatile memory 160, a drive circuit 170 for controlling data write/read and a connection part 180 for connection to the computer or the like. The drive circuit 170, being in a state that the storage device 150 is connected to the external computer, controls writing to and reading from the memory 160 according to a data read/write instruction. The external computer may be a data reading/writing apparatus, for example, in a factory, sales outlet or the like. These are connected to the ink cartridge 100 being in a state prior to mounting on the printer. The apparatus to be connected with the ink cartridge 100 being in a state mounted on the printer includes a printer controller and the like.

Figure 25:
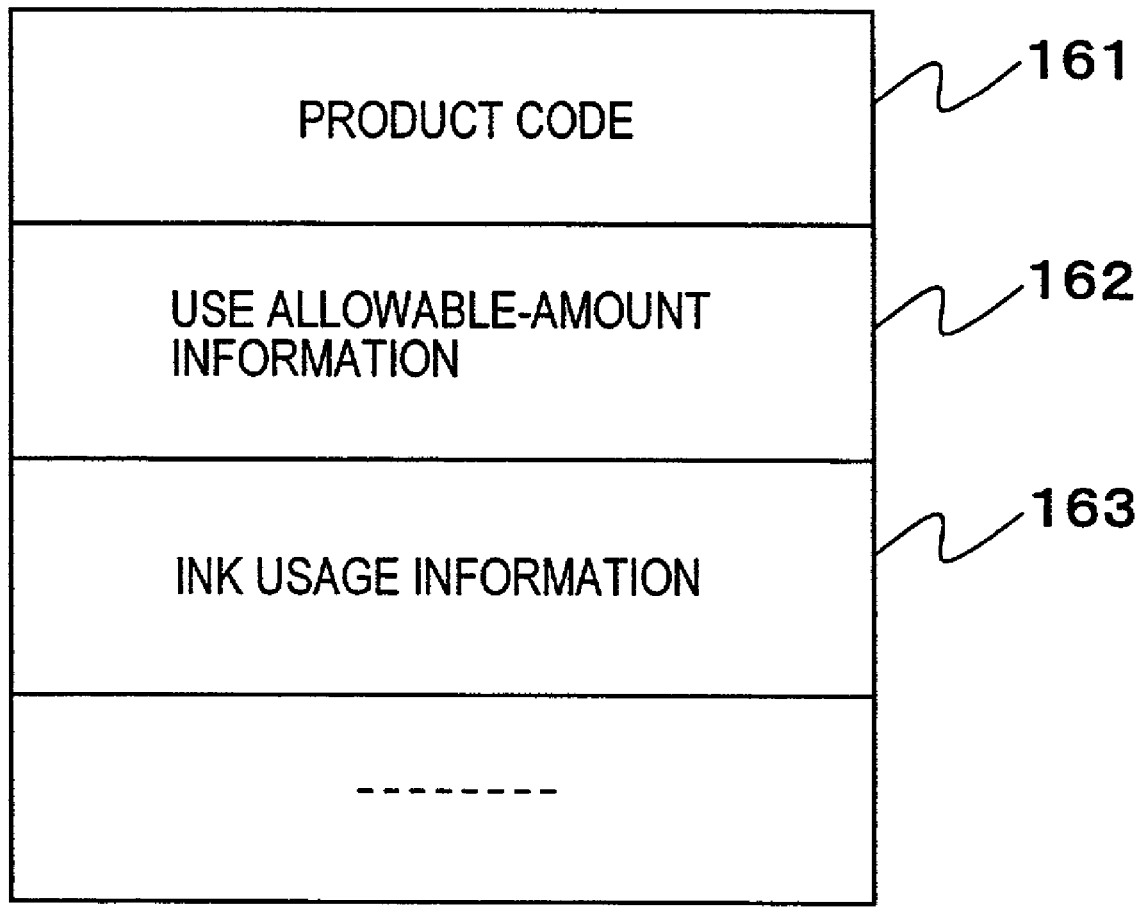
FIG. 25 is an explanatory view showing one example of the information stored in the storage device of the ink cartridge.

The memory 160 is provided, for example, with areas for recording a product code 161, use allowable amount information 162, ink usage information 163 and so on, as shown in FIG. 25. The product code 161 is written to the memory 160, for example, before shipment of the ink cartridge 100. The writing of use allowable amount information 162 is properly made, e.g. upon selling at a sales outlet, upon delivery, after handing over to the user. Meanwhile, where requested through a network NW from a customer, that is made through the network NW. The ink usage information 163 is set at "0" upon shipment.

Note that the memory element 70 shown in FIG. 7 may have the same configuration as the storage device 150.

Incidentally, where setting use allowable amount information is performed through the network, a certain amount, e.g. an initial setting amount required for trial printing may be set before delivering of the ink cartridge 100 to the customer.

Herein, the use allowable amount information 162 can be represented by the information representative of ink amount. Also, this can be represented by converting into the number of pixels the ink amount to be ejected for performing printing with the ink. The usage information 163 can be determined by presuming an ejection amount for respective pixels to be printed and summing up them. Also, this may be determined using a sensor. Furthermore, the amount of use (usage) can be expressed by pixel-conversion from the ink usage. In the present embodiment, the ink amount and the use allowable amount are indicated. Incidentally, the ink amount and the use allowable amount can be represented by a percentage with respect to a maximum amount (total volume) prescribed as the possible amount to be sold.

Figure 21:
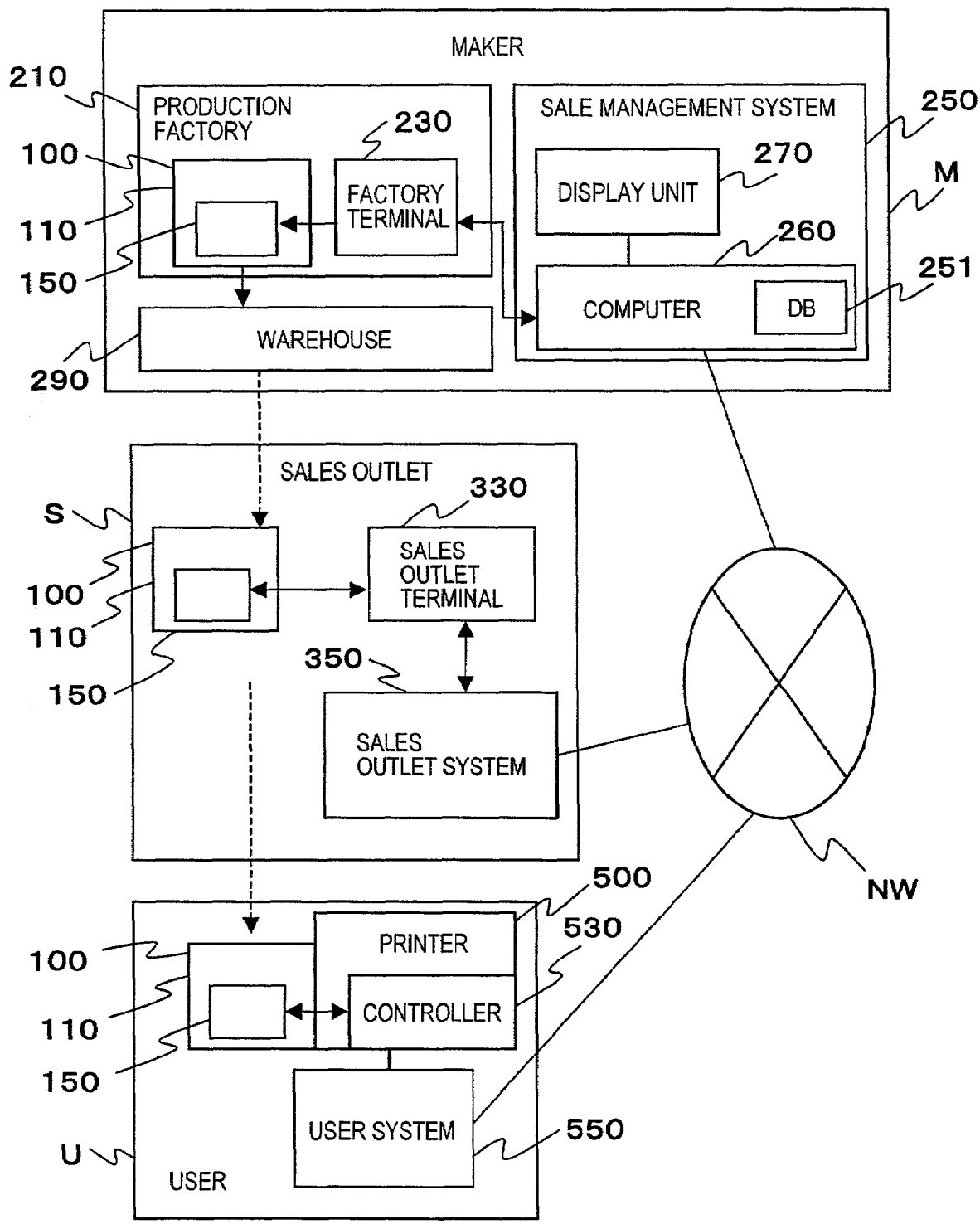
FIG. 21 is a block diagram showing a configuration of one example of an embodiment concerning a providing of a recording material according to the invention.
Figure 22:
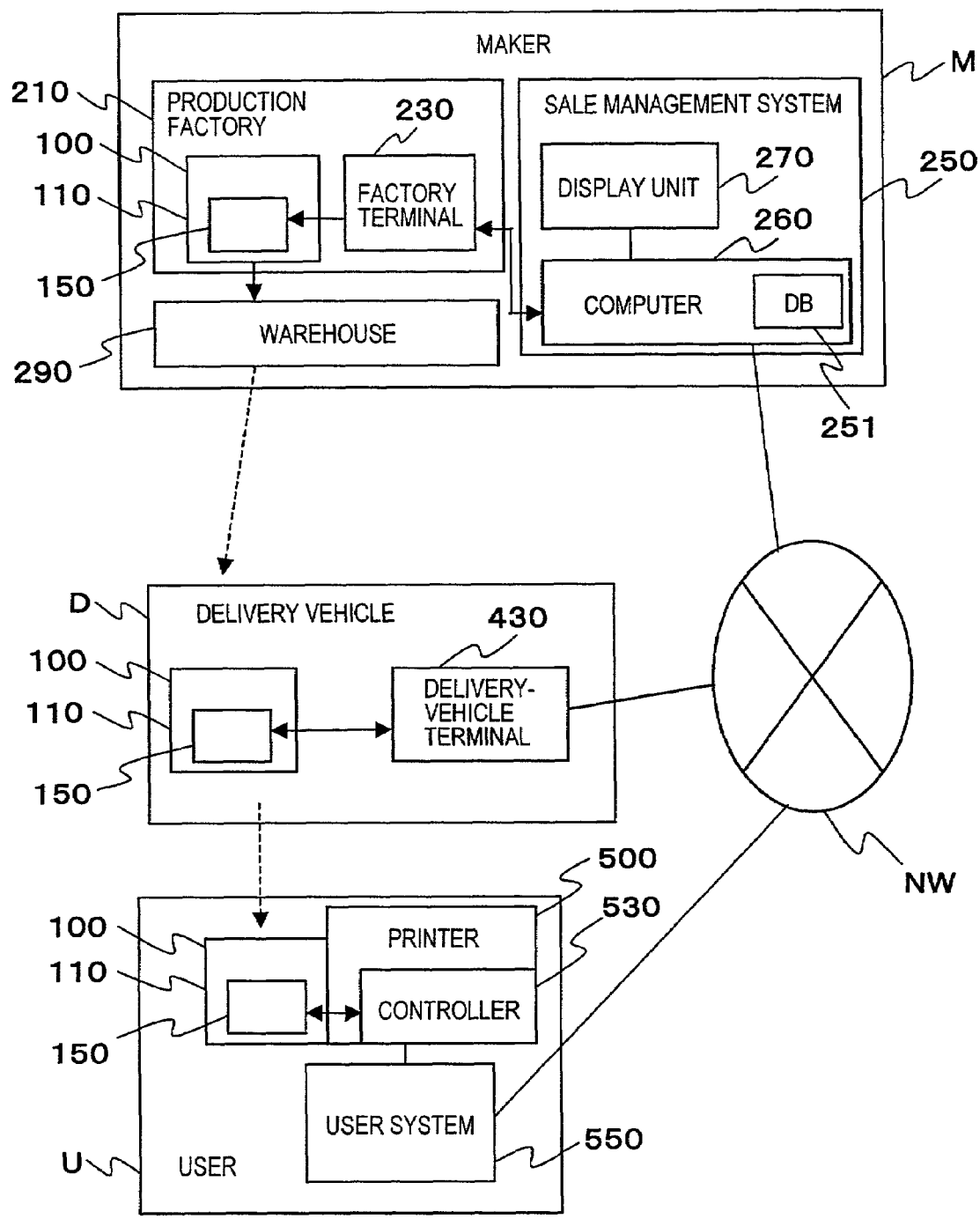
FIG. 22 is a block diagram showing a configuration of one example of an embodiment concerning a providing of a recording material according to the invention.
Figure 23:
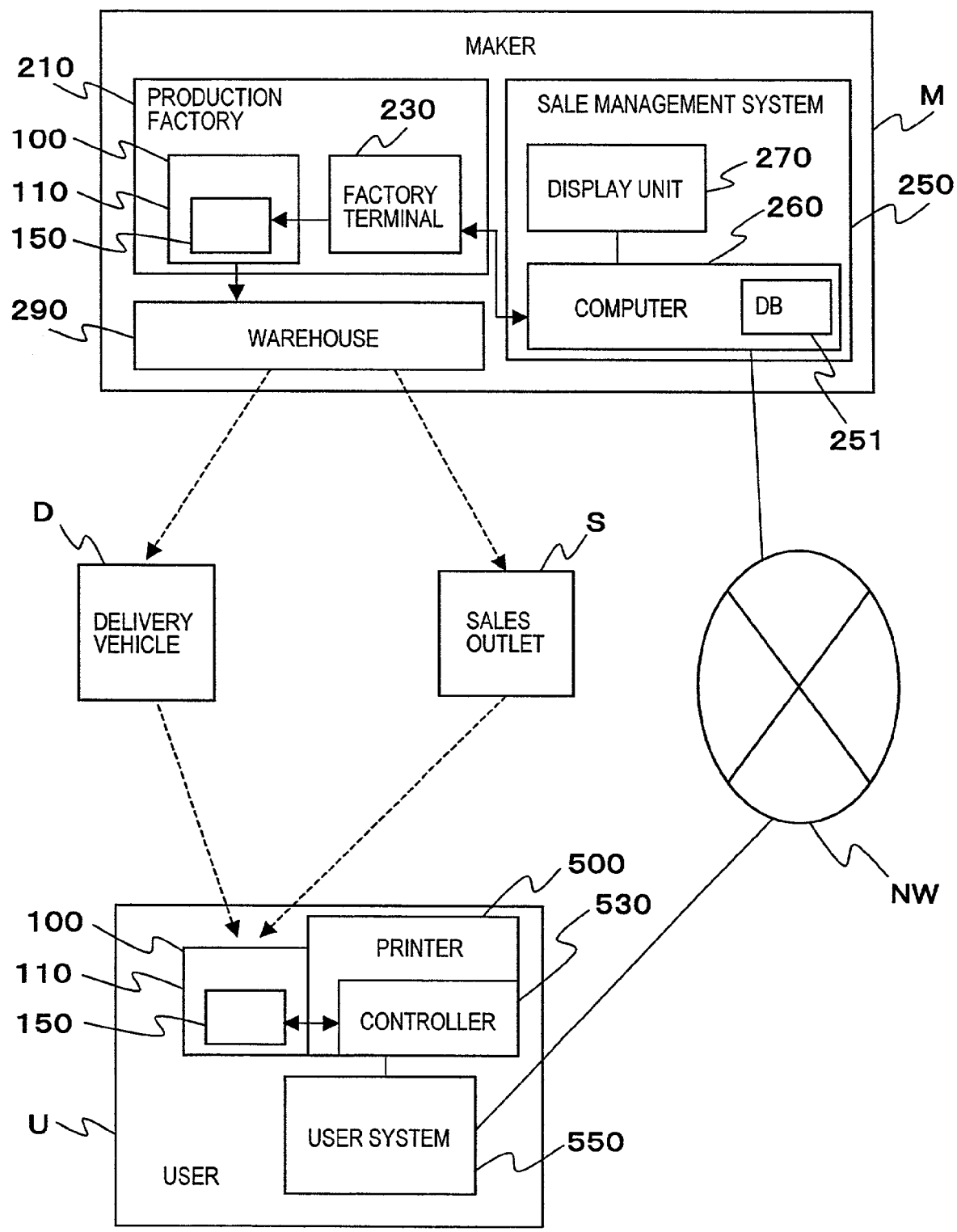
FIG. 23 is a block diagram showing a configuration of one example of an embodiment concerning a providing of a recording material according to the invention.

The present invention can provide a recording material in various modes. For example, included are modes shown in FIG. 21 to FIG. 23. FIG. 21 shows an example in the typical case that the ink cartridge 100 produced by a maker M is soled at a sales outlet S and used by a user U. FIG. 22 shows an example in the case that the ink cartridge 100 produced by the maker M is ordered through a network. This example shows an example in the typical case that the ordered ink cartridge 100 is delivered by a delivery vehicle and used by the user U. FIG. 23 shows an example in the case that the ink cartridge 100 produced by the maker M is ordered through a network, similarly to the case of FIG. 22. Note that the case shown in FIG. 23 is different in that, as mentioned below, the user personally carries out setting of the use allowable amount information to the storage device 150 of the ink cartridge 100. These cases will be explained with reference to the drawings.

FIG. 21 shows the outline of recording-material provision according to the invention. FIG. 21 shows an example in the typical case that the ink cartridge 100 produced by the maker M is sold at the sales outlet S and used by the user U.

The maker M possesses a production factory 210 for producing ink cartridges 100 and a sales management system 250 for managing the sales. In the production factory 210, filled is a certain amount of ink corresponding to the total volume of the ink tank 110 of the ink cartridge 100. In the production factory 210, a factory terminal 230 is placed to manage the production in the factory. The factory terminal 230 writes a product code 161 to the storage device 150 of the ink cartridge 100 in the final process. Meanwhile, the maker M can possess a warehouse 290 to temporarily store therein the produced ink cartridges.

Figure 26:
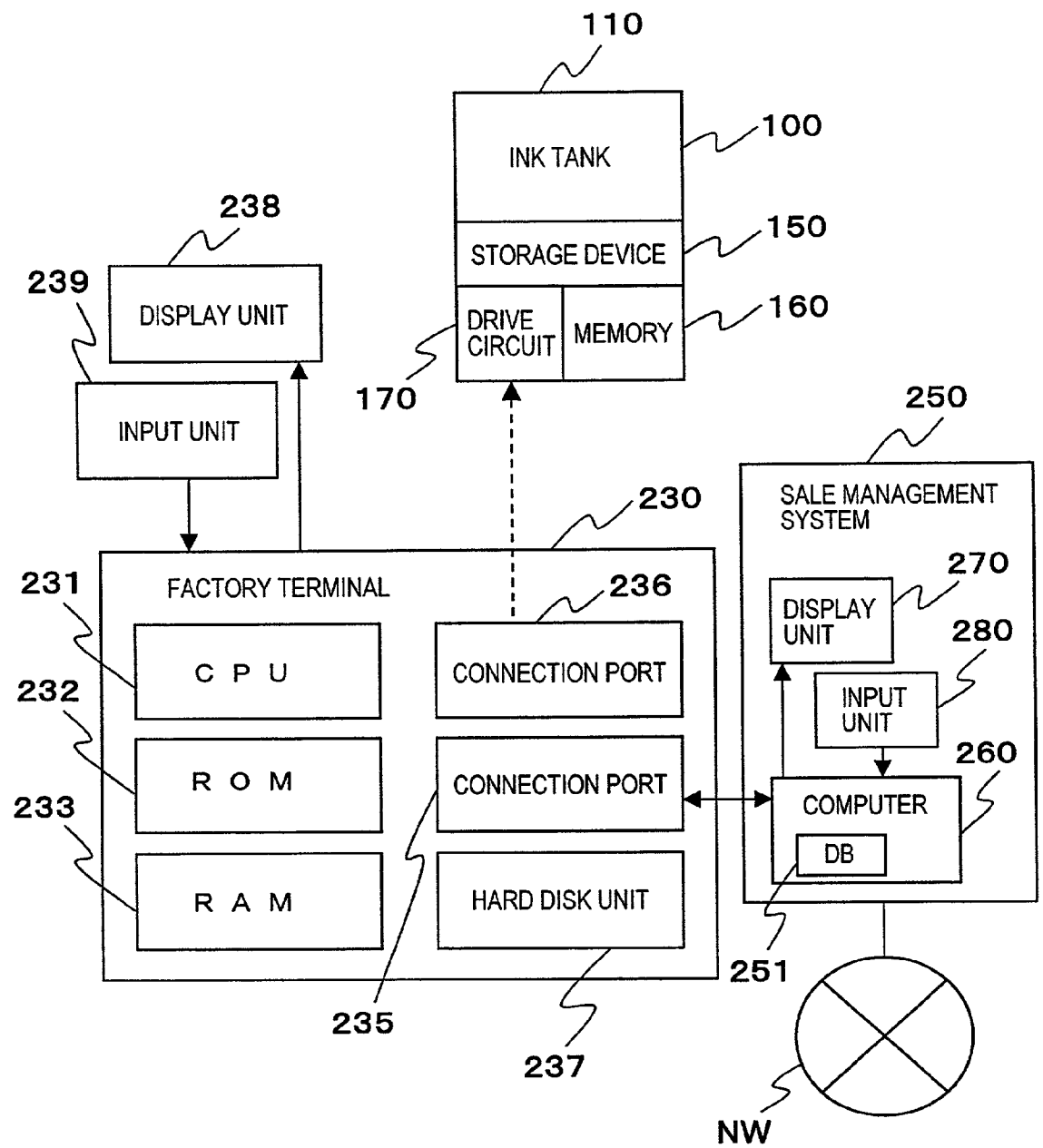
FIG. 26 is a block diagram showing one example of a configuration of a factory terminal and sales management system constituting a system managing shipment and sale in a maker.

The factory terminal 230 has, as shown in FIG. 26, a central processing unit (CPU) 231, a read only memory (ROM) 232 for storing therein programs, a random access memory (RAM) 233 used as a work area, connection ports 235 and 236 for connection with external units, and a hard disk unit 237 for storing programs, data, etc. Also, this has a display unit 238 such as a liquid crystal display and an input unit 239 such as a keyboard or a mouse. Besides these, although not shown, various units which read or store information out of or to a portable recording medium are connected thereto. These units includes, for example, a floppy disk unit, a CD-ROM drive unit and so on. A sales management system 250 is connected to the connection port 235. Also, a drive circuit 170 of the ink cartridge 100 is connected to the connection port 236. The factory terminal 230 writes a product code 161 to the storage device 150 of the ink cartridge 100 to be shiped. Then, the written product code 161 is forwarded to the sales management system 250.

Note that the factory terminal 230 is not necessarily a general-purpose computer having such a configuration as in the present embodiment. This may be a dedicated apparatus capable of merely writing. For example, this may be an apparatus capable of forwarding data and instructing to write it to the drive circuit 170 of the storage device 150 of the ink cartridge being connected.

The sales management system 250 has, as shown in FIG. 26, a computer 260, a display unit 270 and an input unit 280. As the computer 260, a general-purpose computer may be used. The computer 260 can be connected to a sales outlet system 350 (see FIG. 21) and a delivery-vehicle terminal 430 (see FIG. 22) through a network NW. Due to this, the computer 260 transmits and receives information to and from the sales outlet system 350 and delivery-vehicle terminal 430, respectively. This is also connected to a user system 550 (see FIGS. 21 to 23) through the network NW, to transmit and receive information. Meanwhile, the sales management system 250 is connected to the factory terminal 230 (see FIG. 21) through a network, such as a LAN or the Internet. As described before, it receives the products codes 161 written in the respective ink cartridges 100.

Furthermore, the sales management system 250 has a database 251 within the computer 260. In the data base 251, data containing such items as shown in FIG. 30 are accumulated. Namely, using products codes 2511 as keys, an use allowable amount initial setting values 2512, selling prices 2513 of the ink cartridges, use allowable amount additional setting values 2514 and ink selling prices 2515 upon additional setting are accumulated therein. The product code 2511 is the same as the product code written to the storage device 150 of the ink cartridge 100.

The computer 260 of the sales management system 250 previously forwards the information for setting the information representative of use allowable amount to the sales outlet system 350 and delivery-vehicle terminal 430. Specifically, the information representative of the use allowable amount in an amount massed to a certain degree is forwarded to them. For example, a sum of the use allowable amount comparable to the number of shipment cartridges is assumed. Accordingly, in the sales outlet system 350 and delivery-vehicle terminal 430, initial setting and additional setting of the allowable use information can be made to a plurality of ink cartridges within the range of the forwarded sum of the use allowable amount. The sales outlet system 350 and the delivery-vehicle terminal 430 subtract the set use allowable amount from the above-mentioned sum of the use allowable amount thereby determining a new sum use allowable amount. Then, new setting is made based thereon. In this manner, setting can be made until the sum of the use allowable amount runs out.

Meanwhile, the computer 260 receives information representative of the respectively set use allowable amount and selling price together with the product codes from the sales outlet system 350 and delivery-vehicle terminal 430, and stores them to the database 251. Reception can be made at any time, and in proper timing, such as with a constant period. For example, it can be made at the end of operation hours, or the like. In data writing to the database 251, a corresponding product code 2511 is found using the product code 161 as a key, to record thereto an use-allowable-amount initial setting value 2512 and a selling price 2513. Also, an use-allowable-amount additional setting value 2514 and a selling price 2515 are recorded thereon.

The computer 260 can presume sum of the use allowable amounts left based on the respective information forwarded from the sales outlet system 350 and delivery-vehicle terminal 430. Also, a current value of sum of the use allowable amount may be acquired from the sales outlet system 350 and delivery-vehicle terminal 430. Where there reaches a state that the shortage of the sum of the use allowable amount is expected, the sum of the use allowable amount can be reset through the network NW.

Meanwhile, the computer 260 of the sales management system serves also as a Web server. The computer 260 of the sales management system 250 accepts a setting request of use allowable amount information from the user system 550 through the network NW, and forward to each request source the information for writing the information representative of use allowable amount to the memory 160. The information for writing the information representative of use allowable amount to the memory 160 is forwarded, for example, to the e-mail address of the user. Incidentally, the key for downloading the information for writing the information representative of use allowable amount may be forwarded, to allow the user to download the information by using the key. Herein, the information for writing the information representative of use allowable amount can be configured, for example, by the information representative of use allowable amount and the information describing a procedure for writing it to the memory, e.g. a program.

Note that, in the foregoing explanation, it is assumed that the setting request of use allowable amount information is made using the data previously prepared in the user system 550. FIG. 31 is one example of an input screen used thereupon. However, the invention is not limited to this. The data for accepting the use-allowable-amount-information setting request may be forwarded to the user system 550 in a data format viewed and input through a browser of the user system 550, to accept input data by the use of that data.

In the input screen 571 shown in FIG. 31, a use allowable amount setting window 572 is displayed. In the window 572, an ink-use-allowable-amount setting area 573, a user identification information input area 574, a payment assurance information input area 575, and an e-mail address input area 576, a selling price display area 577, TRANSMIT button 578 and CANCEL button 579 are displayed. The input areas 572–576 accept the input of relevant information and display them, respectively. Also, the selling price display area 577, if use allowable information is set, displays a selling price corresponding thereto.

The ink-use-allowable-amount setting area 573, in this embodiment, is to be designated by volume % with respect to a maximum amount (total volume) as a reference prescribed as a possible amount to be sold. Namely, both in the first setting and in the additional setting, objective values are set with respect to the total volume, i.e. 100%, as a reference. For example, when already set at 50% and if additional 25% is to be set, 75% instead of 25% has to be selected. By doing so, to what degree setting can be made furthermore is easily understood. Of course, a value itself to be set may be selected. In this manner, by the selection of an objective value enables the setting of an use allowable amount can be set. In the example shown in FIG. 31, it is set at 50%. Note that, in the initial state that none of the alternatives are selected. Meanwhile, where any value has been selected, it may be made impossible to select the alternatives not higher than the value. For example, in the state that 50% is selected, it is not allowed to select 25% or 50%. Furthermore, these alternatives are displayed in a manner such that it can be understood that they cannot be selected.

To the user identification information input area 574, for example, name, address, telephone number, and the like are inputted. Also, where a customer code has been set, it may be inputted instead of or together with them.

To the payment assurance information input area 575, for example, credit-card information is inputted. Credit-card company name, number, expiration date (good thru), etc. are inputted thereto.

To the e-mail address input area 576 is inputted a mail address for receiving the information to write the information representative of use allowable amount to the storage device.

The data thus inputted, if clicking TRANSMIT button 578, is forwarded to the sales management system 250 through the network NW. Note that, where no transaction is made, CANCEL button 579 is clicked so as to cancel the so-far inputted information.

Note that the screen similar to the screen shown in FIG. 31 can also be used on the sales outlet terminal 330 and the delivery-vehicle terminal 430. This allows for setting of an use allowable amount by performing operation similar to the user system also on the sales outlet system 350 and the delivery vehicle terminal 430. However, it is assumed in the present embodiment that, in the sales outlet system 350 and the delivery vehicle terminal 430, the use allowable amount be set off-line. Accordingly, it is possible to omit the input to the user identifying information area 574. Also, where a credit card is not used in payment, it is possible to omit the input to the pay assurance information input area 575. Of course, on the sales outlet system 350 and the delivery vehicle terminal 430, the setting of an use allowable amount may be made possible on-line instead of off-line or together therewith.

On the sales management system 250, various settings can be performed through the input unit 280. Also, sales situation and the like can be known with the display unit 270.

Next, the system configuration in the sales outlet S will be explained with reference to FIG. 27. The sales outlet S has a sales outlet terminal 330 and a sales outlet system 350. The sales outlet terminal 330 carries out processing of writing allowable amount information to the storage device 150 at the time of sales of an ink cartridge 100. Also, it carries out processing of writing an additional use allowable amount to an ink cartridge 100 purchased by a customer.

Figure 27:
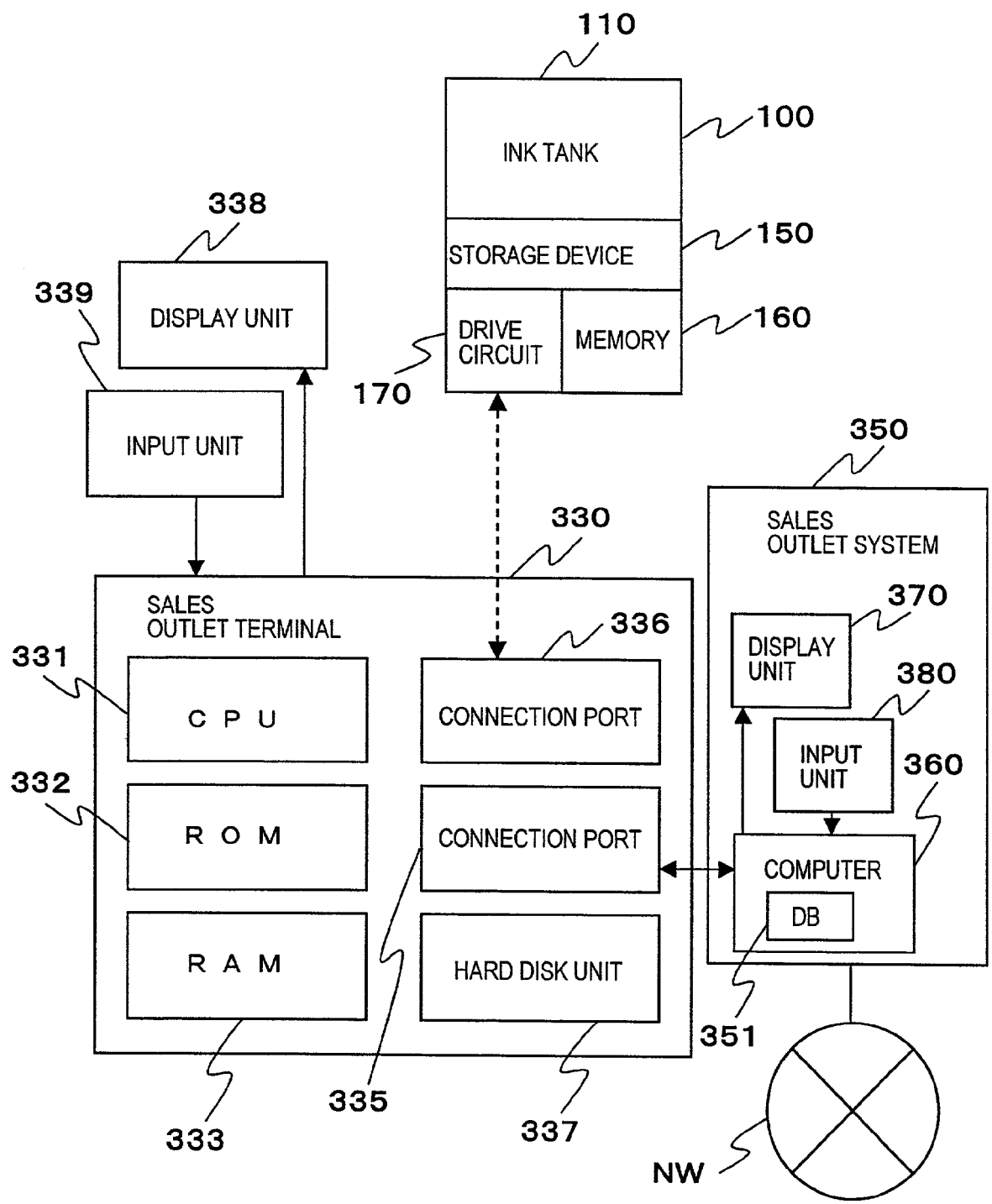
FIG. 27 is a block diagram showing one example of a configuration of a sales outlet terminal and sales outlet system constituting a system managing sale in a sales outlet.

The sales outlet terminal 330 has, as shown in FIG. 27, a central processing unit (CPU) 331, a read only memory (ROM) 332 storing programs, a random access memory (RAM) 333 used as a work area, connection ports 335 and 336 for connection to external units, and a hard disk unit 337 storing programs, data and the like. This also has a display unit 338 such as a liquid crystal display and an input unit 339 such as a keyboard, a mouse or the like. Besides these, although not shown, various units may be connected to read from or store to a portable recording medium. These units include, for example, a floppy disk unit, a CD-ROM drive unit and the like. The sales outlet system 350 is connected to the connection port 335. Meanwhile, the drive circuit 170 of an ink cartridge 100 is connected to the connection port 336. The sales outlet terminal 330 writes use allowable amount information to the storage device 150 of an ink cartridge 100 to be sold on the basis of the sum of the use allowable amount managed by the sales outlet system 350.

Note that the sales outlet terminal 330 is not necessarily a general-purpose computer having such a configuration as in the present embodiment. It may be a dedicated unit capable of merely writing. For example, it may be a unit capable of forwarding data to the drive circuit of the storage device 170 of the connected ink-cartridge and instructing to write the data therein.

The sales outlet system 350 has, as shown in FIG., 27, a computer 360, a display unit 370 and an input unit 380. As the computer 360, a general-purpose computer may be used. The computer 360 is connected to the sales management system 250 through a network NW, to transmit and receive information. Namely, as described above, it receives the setting of sum of the use allowable amount and forwards a set use allowable amount together with the corresponding product code to the sales management system 250.

Furthermore, the sales outlet system 350 has a database 351 within the computer 360. In the database 351, such data as shown in FIG. 30 are accumulated, similarly to the foregoing database 251. Namely, using a product code 2511 as a key, a use-allowable-amount initial setting value 2512, a selling price 2513 of the ink cartridge, a use-allowable-amount additional setting value 2514 and an ink selling price 2515 upon additional setting are accumulated, respectively.

The computer 360 of the sales outlet system 350 previously receives the information for setting the information representative of use allowable amount from the sales management system 250. Specifically, as described before, it receives the information representative of sum of the use allowable amount in an amount massed to a certain extent. The sales outlet system 350 is allowed to make initial setting and additional setting of the use allowable amount information on a plurality of ink cartridges within the range of the sum of the use allowable amount. The sales outlet system 350, determines a new sum of the use allowable amount by subtracting the set use allowable amount from the foregoing sum of the use allowable amount. Based on this, new setting is made. In this manner, it is possible to perform setting until the sum of the use allowable amount runs short.

Meanwhile, the computer 360 can transmit the information representative of a use allowable amount and selling price set for respective products, together with the product code, in proper timing, e.g. at any time, with a constant period or the like. For example, the information can be transmitted to the sales management system 250 at the finish time of operation or the like. Note that the computer 360 can forward the current value of sum of the use allowable amount to the sales management system 250. Also, it also can request to reset the sum of the use allowable amount.

Figure 32:
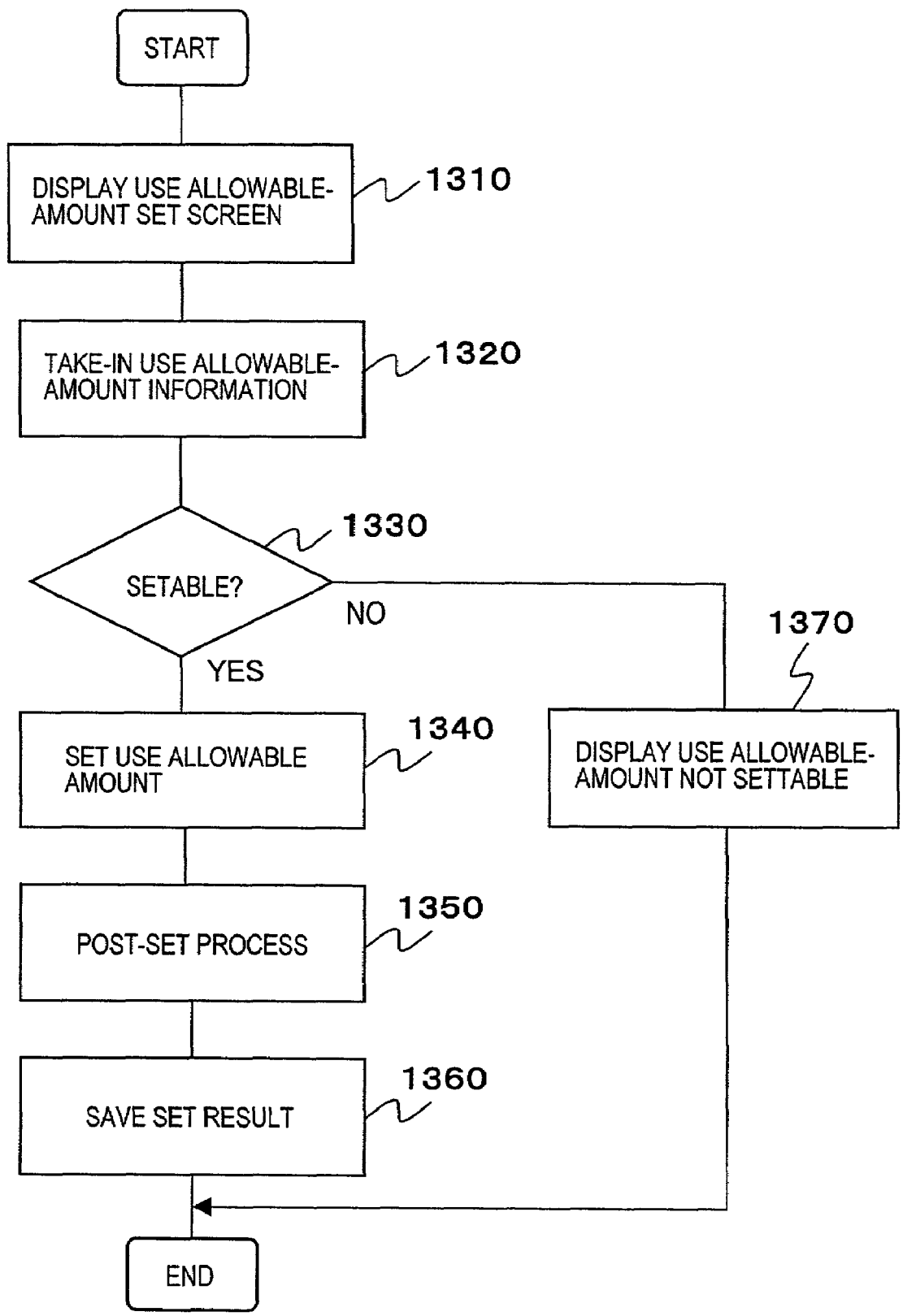
FIG. 32 is a flowchart showing one example of a process procedure of a program for a use-allowable-amount setting process.

The use allowable amount setting by the sales outlet terminal 330 will be explained with reference to FIGS. 31 and 32. Herein, it is assumed a case that a customer per se operates the sales outlet terminal so as to perform the input. Of course, the operator of the sales outlet S may carry out input operation.

In the sales outlet terminal 330, the storage device of an ink cartridge 100 is connected to the connection port 336. When the setting of use allowable amount information is requested from the input unit 339, the CPU 331 displays a setting input screen 571 having a use allowable amount setting window 572 as shown in FIG. 31 (step 1310). Also, use allowable amount information is read from the memory 160 of the storage device 150 of the ink cartridge 100 (step 1320). Note that, at this time, a product code 161 is read out together therewith. Then, the CPU 331 determines whether a further use allowable amount can be set based on the read use allowable amount information (step 1330). The result of it is shown in the use allowable amount setting area 573 of the window 572. Herein, where the use allowable amount is not yet set to the ink cartridge 100, the state is displayed that any of the alternatives of 25%, 50%, 75% and 100% is not selected in the ink use allowable amount setting area 573. Where any of the alternatives is already selected, that is shown. Thereafter, the setting of the use allowable amount is accepted, to set the information representative of the set use allowable amount to the memory 160 of the ink cartridge 100 (step 1340). On the other hand, where the use allowable amount cannot be set, it is indicated that the use allowable amount cannot be set (step 1370).

The use allowable amount is set by accepting the selection of any of the alternatives of 25%, 50%, 75% and 100% as described before. Herein, if the customer selects an alternative of 50% for example, the CPU 331 displays a state that the alternative of 50% is selected and holds the data thereof in the RAM 233. Also, if any alternative is selected, it refers to not-shown price information to display the corresponding selling price in the selling price display area 577. Herein, in the case of new setting, displayed is a selling price including a price of the ink cartridge 100 itself. Meanwhile, in the case of additional setting, displayed is a selling price corresponding to the added ink amount. Note that selling price may be set as a price proportional to a use-allowable-amount setting value, e.g. each value of 25% to 100%.

Meanwhile, where the customer intends to make payment with a credit card, it is requested to input necessary information such as a credit-card number to the pay assurance information input area 575.

Next, the CPU 331 calculates the use allowable amount from the selected setting value and forwards the information representative of the use allowable amount to the drive circuit 170 through the connection port 336 thereby setting it as the use allowable amount information 162 to the memory 160 (see FIG. 27). Also, a settlement process is made on a sum corresponding to the selling price by using the acquired credit card number (step 1350).

Thereafter, the CPU 331 forwards the information 162 representative of the set use allowable amount, the product code 161 and the selling price to the foregoing sales outlet system 350 and acumulates them in the database 351 (step 1360).

In this manner, in the sales outlet it is possible to set, on the ink cartridge 100, the information representative of the ink use allowable amount. By this, production of the usable ink cartridge has substantially been completed and the ink cartridge has been sold. Accordingly, the ink cartridge, in a state so far, is in a semi-product state and entered with an extremely cheap inventory price to the book.

The above-described processing can be realized by executing the program stored in the ROM 332 and/or the program installed on the hard-disk unit 337.

Figure 28:
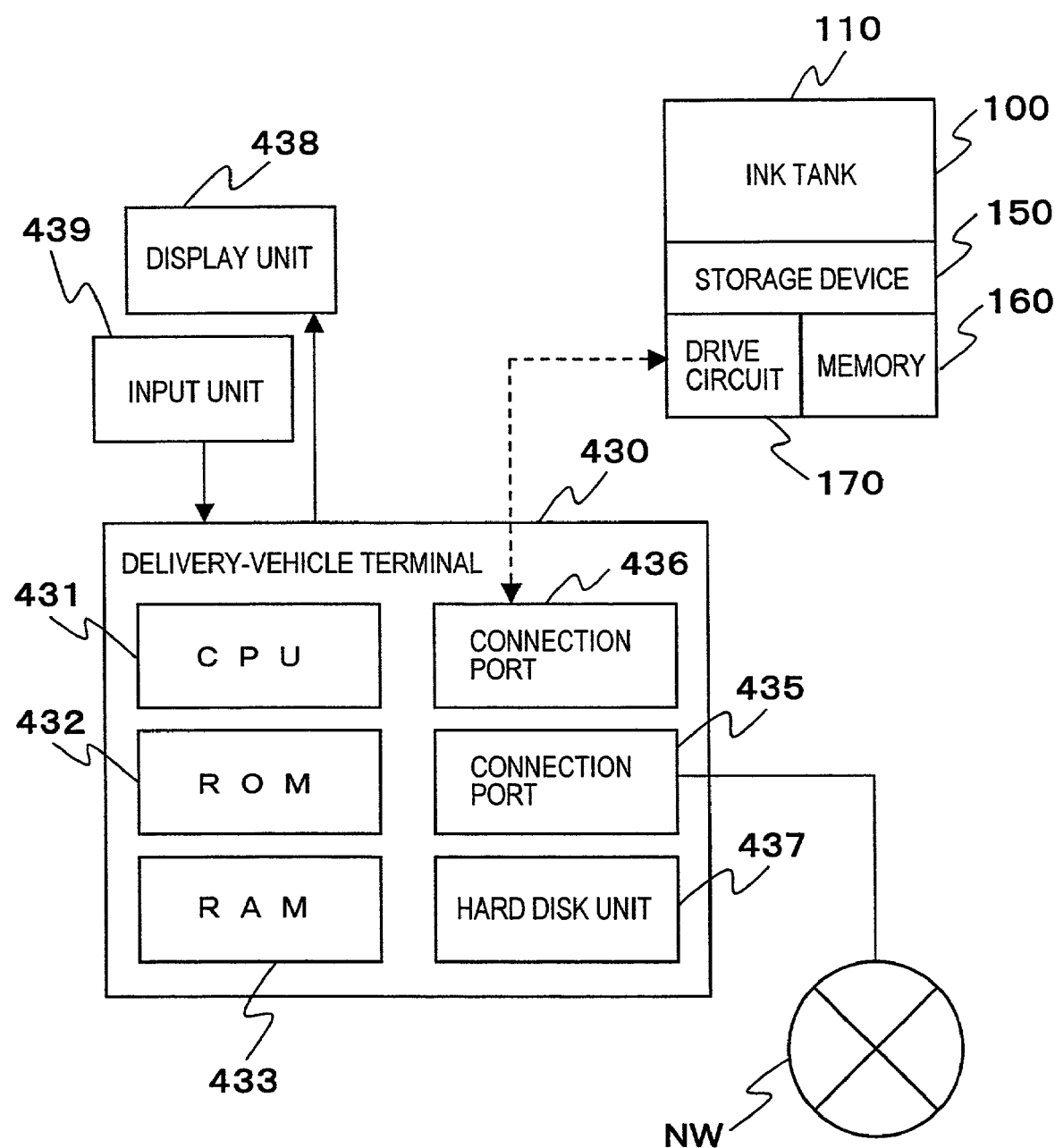
FIG. 28 is a block diagram showing one example of a configuration of a delivery vehicle terminal mounted on a delivery vehicle for ink-cartridge delivery.

Next, the delivery-vehicle terminal 430 will be explained with reference to FIG. 28. The delivery-vehicle terminal 430 basically has the configuration similar to the sales outlet terminal 330. However, this is mounted on a delivery vehicle and hence not connected to a system corresponding to the sales outlet system. Consequently, it has a configuration in which the delivery vehicle terminal realizes by itself the function of a sales outlet system. Namely, substantially, this possesses extra data storage and processing software which correspond to the sales outlet system.

Note that the configuration and operation of the delivery-vehicle terminal 430 is similar to the foregoing sales outlet terminal 330, and hence explanation thereof is omitted.

Next, the image forming apparatus used by a user will be explained with reference to FIG. 29. The user has a printer 500 as an image forming apparatus. Also, the user has a user system 550 as a system for controlling the printer to carry out image forming.

Explanation will be made on the printer 500 and the user system 550.

Figure 29:
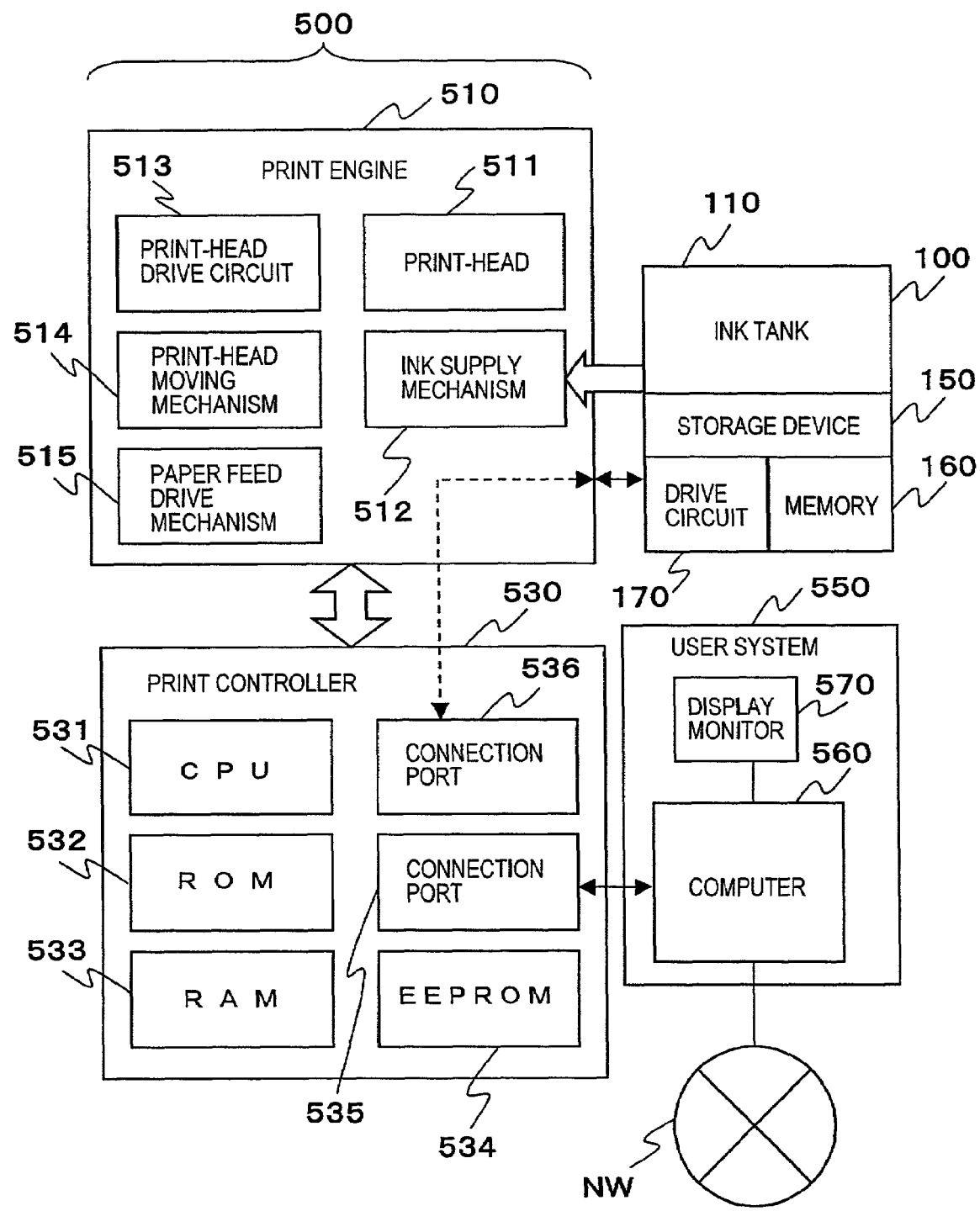
FIG. 29 is a block diagram showing one example of a configuration of a printer loaded with an ink cartridge according to the invention to carry out print and user system connected therewith.

The user system 550 shown in FIG. 29 has a computer 560, a display unit 570 and a not-shown input unit. To the computer 560, a printer driver to cause the printer 500 to generate the data to be printed is installed. The printer driver includes a program for setting an ink use allowable amount shown in the foregoing FIG. 32. The program for the use allowable amount setting is basically the same as that used in the foregoing sales outlet terminal. However, it is different in that the opposite of transmission/reception is the sales management system 250. The use allowable amount setting with this program was already described and hence explanation is not repeated.

The printer 500 shown in FIG. 29 has a print engine 510 to form images on the paper and a print controller 530 to control the image forming in the print engine 510. An ink cartridge 100 is attached to the print engine 510. Meanwhile, the print controller 530 is connected to a computer 560 of a user system 550 directly or through a network such as a LAN.

The print engine 510 has a print head 511 for ejecting ink to form an image on the paper, an ink supply mechanism 512 for supplying ink from the ink cartridge 100 to the print head 511, an print-head drive circuit 513 for causing the print head 511 to make ink-ejecting action, a print-head moving mechanism 514 for moving the print head 511, and a paper-feed drive mechanism 515 for feeding the paper. The ink supply mechanism 512, the print-head drive circuit 513, the print-head moving mechanism 514 and the paper-feed drive mechanism 515 are controlled in their operation by the print controller 530. This allows the print head 511 to visibly form an image of given print data on the paper.

The print controller 530 has a central processing unit (CPU) 531, a read only memory (ROM) 532 for storing a program to be executed by the CPU 531, a random access memory (RAM) 533 for storing programs, data, etc., an EEPROM 534 as a rewritable non-volatile memory, a connection port 535 for connection to a computer or the like and a communication port 536 for communication to a LAN.

In the present embodiment, the print controller 530 is locally connected to the computer 560 through the connection port 535.

The ROM 532 stores, at least, a print operation control program to process the image data forwarded from the computer 560 and forward it to print engine 510 thereby causing the printer engine 510 to perform printing, and an operation capability managing program for managing the operation capability of the printer. These programs are executed by the CPU 531, to realize the corresponding functions, respectively. The operation capability managing program includes a program to manage ink usage and a program to control writing of data to a storage device 150.

Figure 33:
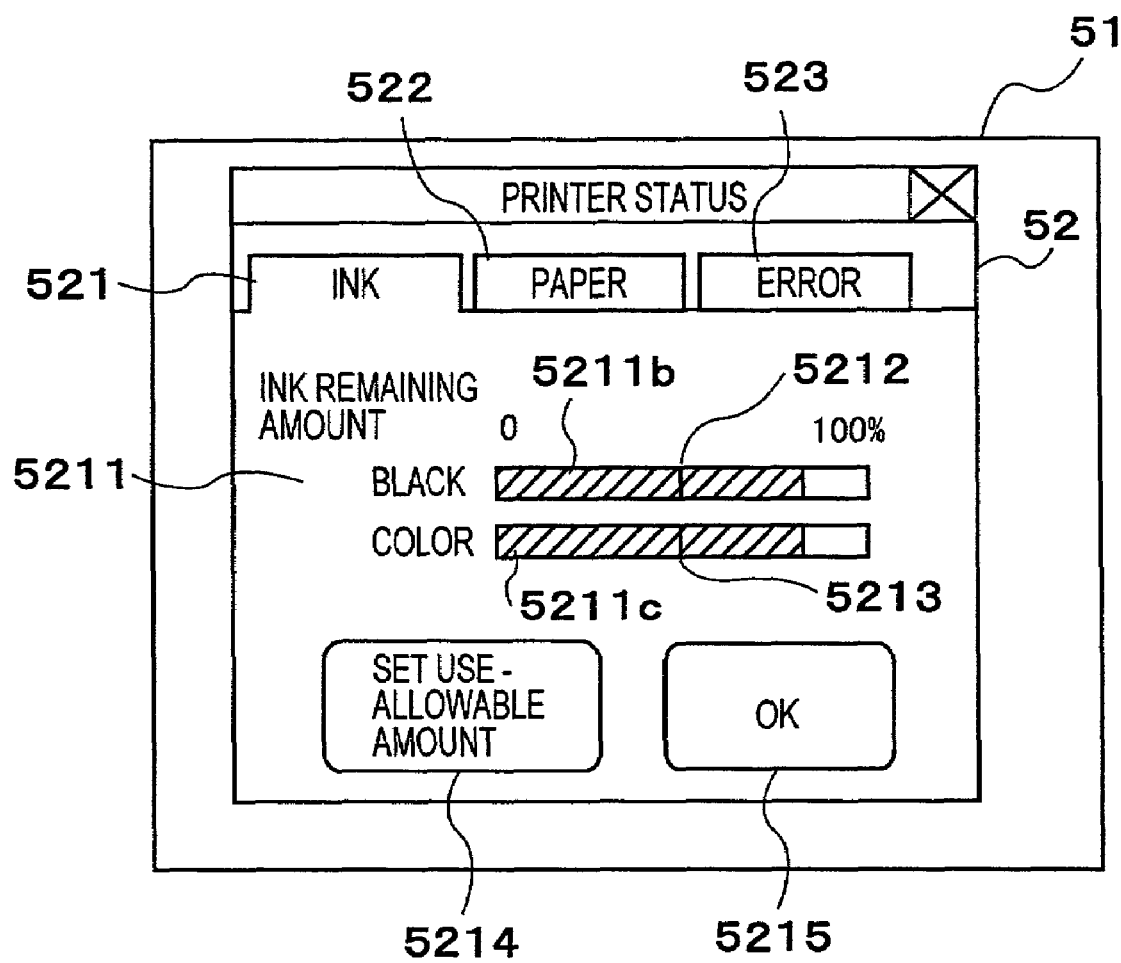
FIG. 33 is an explanatory view showing an example of a screen showing a printer status, particularly an example of a screen showing an ink remaining amount.

The program for managing ink usage acquires the information representative of an ink usage in the printer and updates the information representative of the usage so-far stored. Specifically, each time printing is made, the program determines the amount of ink to be used and calculates a cumulative ink usage, thereby updating the information representative of the so-far ink usage stored in the EEPROM 534. This information is stored as ink usage information 163 to the memory 160 of the ink cartridge 100. Meanwhile, this information is delivered to the computer 560, and it is illustratively displayed by a bar in the ink remaining-amount display area 5211 as shown in FIG. 33. Namely, as shown in FIG. 33, respective remaining amounts of black ink and color ink are displayed by the length of a hatched areas 5211b and 5211c. Also, where the printer has a panel, the remaining amounts are also displayed thereon.

Figure 34:
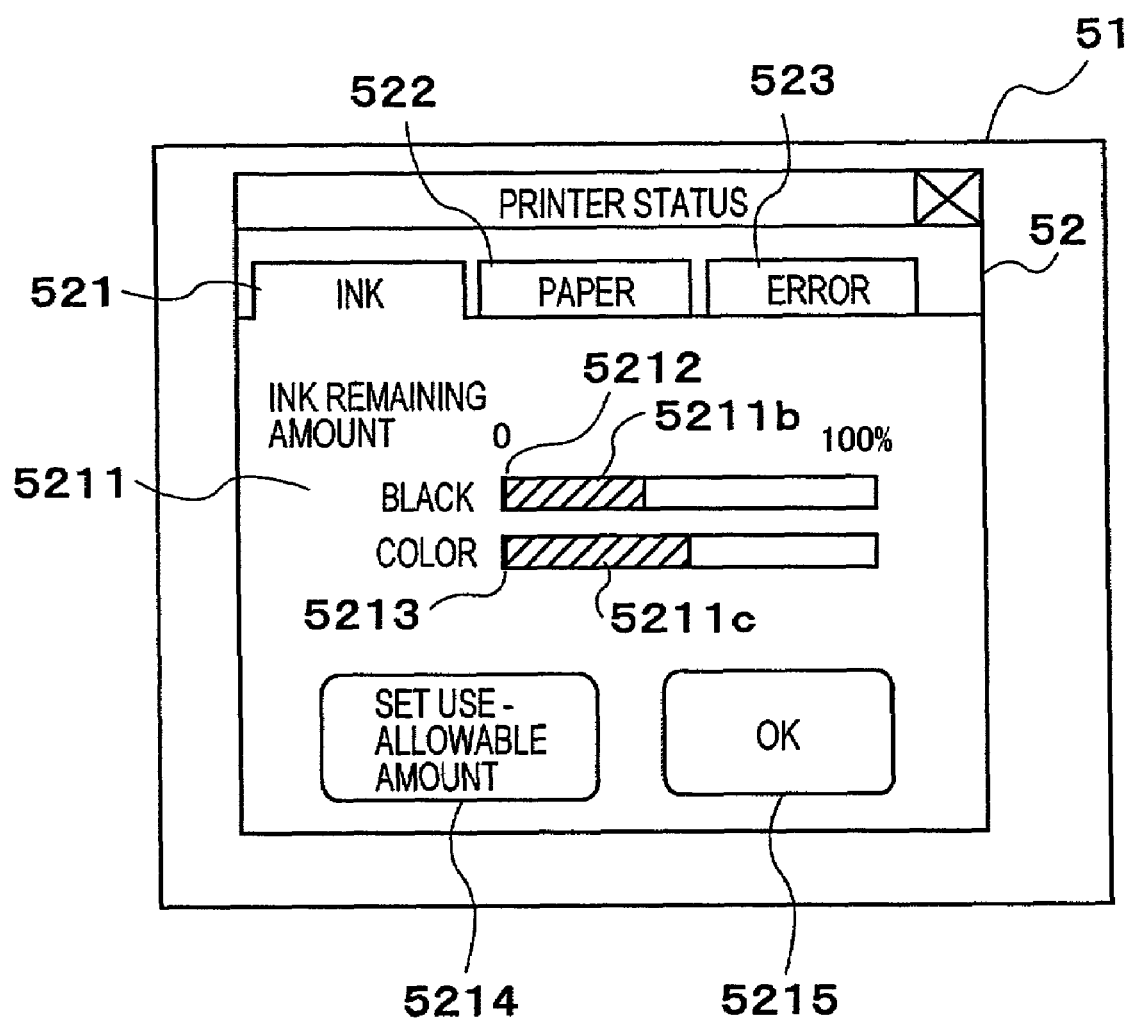
FIG. 34 is an explanatory view showing an example of a screen showing a printer status, particularly an example of a screen showing an ink remaining amount.

Incidentally, although in FIG. 33 and FIG. 34, the lengths of the hatched areas 5211b and 5211c, show remaining amounts, the length of the hatched area is displayed as a usage and the remaining length as a remaining amount, as shown in FIG. 10.

The displayed remaining amount is indicated as the total volume being 100%. Furthermore, the symbols for showing a set use allowable amount, i.e. lines 5212 and 5213 in FIG. 33 are displayed together therewith. The positions of these lines 5212 and 5213 show the use allowable amount. In FIG. 33, the lines 5212 and 5213 are shown at a position of 50%, respectively. This shows that the set use allowable amount is 50%. The current remaining amount, in FIG. 33, is shown by a right-end position of the hatched area. In the example shown in FIG. 33, it is shown that the remaining amounts are nearly 80% for both block ink and color ink. Consequently, the remaining 30% is usable up to the remaining amount of 50%. When any one remaining amount of black ink and color ink reaches the position of line 5212 or 5213, printing service will be shut down. Printing service can be shut down by any of the user system 550 and the print controller 530.

In the case of carrying out the above processing by the print controller 530, the print controller 530 reads the use allowable amount information and the ink usage information at any time from the memory 150 of the ink cartridge 100 and stores it in the EEPROM 534. If printing is instructed, print data processing is started to update the ink usage information along with the print data processing. Then, the updated ink usage information and the use allowable amount information are compared to each other. When the value of ink usage information reaches the use allowable amount information value (e.g. amount corresponding to 50%), printing service is shut down. Thereafter, when the use allowable amount information is designated with a further greater value (e.g. 100%), because the current value of the ink usage information is smaller than the value of the use allowable amount information, printing service is resumed. Incidentally, the print controller 530, upon request, forwards the use allowable amount information and ink usage information to the user-system computer 560. Receiving this, the computer 560 performs display of an ink use allowable amount and processing such as a remaining-amount display and the like.

Meanwhile, where carrying out printing-service shut down processing of the printer by the user system 550, its function is added to a printer driver to be installed. Namely, the computer 560 causes the printer driver to function, requests for the print controller 530 to send the use allowable amount information and the ink usage information and properly acquires these pieces of information. The print controller 530 forwards these pieces of information stored in the EEPROM 534 to the computer 560. Then, the computer 560 shuts down the printing service when the value of the ink usage information reaches the use allowable amount information value (e.g. amount corresponding to 50%). Thereafter, when the use allowable amount information is set to a further greater value (e.g. 100%), because the current value of the ink usage information is smaller than the value of the use allowable amount information, printing service is resumed.

In the case where there is a remaining amount, if the use allowable amount is reset, it is possible to use the ink until reaching that remaining amount. For example, if in resetting the use allowable amount is set at 100% of the total volume, the foregoing lines 5212 and 5213 are displayed in an overlapped manner on the positions of remaining amount of 0%, thereby making it possible to use all the remaining amount Of course, where the use allowable amount of 100% is set from the beginning, the foregoing lines 5212 and 5213 are displayed in an overlapped manner on the positions of remaining amount of 0%, thereby making it possible to use all the ink. Meanwhile, in the case where the use allowable amount is set at 75% of the total volume, the foregoing lines 5212 and 5213 are displayed at the positions of remaining amount of 25%, thereby making it possible to use to that position. FIG. 34 shows the case that the use allowable amount is set at 100% from the beginning or due to additional setting.

Meanwhile, as shown in FIGS. 33 and 34, these screens are provided with a button 5214 for performing the setting of a use allowable amount. If this button 5214 is clicked, that is notified to the user system 550 to start up a use allowable amount setting program possessed by the driver. Thus, it becomes possible to set the use allowable amount as in the above-described manner.

As described above, in the present invention, the ink cartridge 100 with a total ink volume of 100% in its ink tank 110 is shipped, a use-allowable amount of which required by the user is written to the storage device 150 of the ink cartridge 100, thereby obtaining an effect similar to the case where an ink cartridge having a desired ink amount is purchased. Namely, the user is allowed to purchase a cheap ink cartridge suited for expected usage while the maker, with one-kind product, can meet the user's diversified requirement. Meanwhile, where the user desires to use ink in a use-allowable amount greater than the amount initially set by the user, the use-allowable amount is reset through a network or bringing it to a sales outlet, thereby making it possible to use the ink cartridge as long as it has the remaining ink. Accordingly, it is possible to flexibly cope with ink supply in compliance with user's ink cartridge use situation.

Although the above embodiment describes with respect to ink, it is needless to say that it can be applied to other recording materials, such as toner.

Meanwhile, although use-allowable amount is set on the premise that the ink cartridge is attached with a product code, this is not limitative.

According to the invention, it is possible to set a use-allowable amount of an image forming medium of an image forming apparatus in conformity with user's utilization form.

The above examples describes on the case that a use-allowable amount is designated as designation of operation capability. The invention is not limited to this. For example, it is possible to store the designation of a qualitative operation capability such as the foregoing basic model to the storage device 150 of the ink cartridge thereby causing the printer read out it to operate according to the designation of the operation capability.

As described above, according to the present invention, the operation capability of an image forming apparatus can be managed in conformity with user's utilization form.

The invention claimed is:

1. A use management method of an image forming apparatus, comprising:
   rewritably holding operation capability designation information for designating to said image forming apparatus an operation capability thereof; and
   forming an image within a range of the operation capability designated by the held operation capability designation information,
   wherein the operation capability designation information contains information for designating at least one of quality and quantity in terms of capacity indicated by inherent capability information, where the inherent capability information indicates a maximum designation limit for the image forming device.

2. The use management method of an image forming apparatus according to claim 1, wherein:
   said image forming apparatus has storing means, and when the operation capability designation information is written to said storing means, said image forming apparatus can perform a corresponding image forming operation on the basis of the information; and
   operation capability designation information is transmitted to said image forming apparatus through a network and stored to said storing means.

3. A sales method of an image forming apparatus, comprising:
   supplying operation capability designation information for designating an operation capability to said image forming apparatus equipped with a memory to rewritably hold said operation capability designation information of designating the operation capability of said image forming apparatus, and
   performing accounting processing in accordance with said supplied information,
   wherein the operation capability designation information contains information for designating at least one of quality and quantity in terms of capacity indicated by inherent capability information, where the inherent capability information indicates a maximum designation limit for the image forming device.

4. A printing apparatus for carrying out printing on a paper, said printing apparatus comprising:
   means for rewritably holding operation capability designation information for designating an operation capability of said printing apparatus;
   means for determining whether an inputted printing request can utilize said printing apparatus, based on print data, information representative of utilization status of said printing apparatus and the operation capability designation information; and
   means for carrying out a printing operation when the printing request can utilize the printing apparatus,
   wherein the operation capability designation information contains information for designating at least one of quality and quantity in terms of capacity indicated by inherent capability information, where the inherent capability information indicates a maximum designation limit for the image forming device.

5. A system for providing information for designating an operation capability of an image forming apparatus, which comprises:
   means for accepting a designation request of an operation capability of said image forming apparatus; and
   means for transmitting the operation capability designation information to a request source which sent said request,
   wherein the operation capability designation information contains information for designating at least one of quality and quantity in terms of capacity indicated by inherent capability information, where the inherent capability information indicates a maximum designation limit for the image forming device.

6. A use management method of an image forming apparatus for forming an image, comprising:
   causing said image forming apparatus to store operation capability designation information for designating an operation capability of said apparatus;
   maintaining said image forming apparatus in a usable state where a use request for said apparatus falls within a range of the operation capability represented by the operation capability designation information; and
   placing said image forming apparatus in a non-usable state where the use request for said apparatus is out of the range of the operation capability represented by the operation capability designation information,
   wherein the operation capability designation information contains information for designating at least one of quality and quantity in terms of capacity indicated by inherent capability information, where the inherent capability information indicates a maximum designation limit for the image forming device.

7. The use management method of an image forming apparatus according to claim 6, wherein:
   the operation capability designation information for designating an operation capability of said apparatus is transmitted to said image forming apparatus through a network.

8. The use management method of an image forming apparatus according to claim 7, wherein:
   operation capability designation information is previously stored in said image forming apparatus, thereafter, where a use request for said apparatus is out of a range of the operation capability represented by the operation capability designation information, new operation capability designation information for making said use request fallen out of the range of the operation capability possible is transmitted to said image forming apparatus through the network.

9. A method of providing an image forming apparatus for forming an image, comprising:
   preparing an image forming apparatus which has storing means and which can perform a corresponding image forming operation on the basis of the information when information for designating an operation capability is written to said storing means;

a recording medium which records therein the operation capability designation information for designating an operation capability; and reading the operation capability designation information from said recording medium to write the information to said storing means thereby placing said image forming apparatus having said storing means in a usable state, wherein the operation capability designation information contains information for designating at least one of quality and quantity in terms of capacity indicated by inherent capability information, where the inherent capability information indicates a maximum designation limit for the image forming device.

10. An image forming apparatus for forming an image on a paper, which comprises:

storing means for storing information for designating an operation capability;

interface means for externally accepting writing of operation capability designation information of designating the operation capability to said storing means;

control means for controlling, when the operation capability designation information is written to said storing means, execution of a corresponding image forming operation on the basis of the operation capability designation information while the information is effective; and image forming means being controlled by said control means and forming an image onto a paper;

wherein update of the operation capability designation information can be done in said storing means, and wherein the operation capability designation information contains information for designating at least one of quality and quantity in terms of capacity indicated by inherent capability information, where the inherent capability information indicates a maximum designation limit for the image forming device.

11. An apparatus for forming an image, which comprises:

an image forming section and a control section for controlling said image forming section;

said control section comprising means for accepting setting of a use limit of said apparatus, means for detecting a use degree of said apparatus, and means for determining whether the detected use degree reaches the use limit to prohibit image forming operation by said image forming section;

wherein said means for accepting setting of a use limit can be reset, and wherein the setting of the use limit quantitatively designates an inherent operation information which indicates a maximum designation limit for the image forming device.

12. An image forming apparatus for forming an image by the use of an image forming medium, which comprises:

an image forming section and a control section for controlling said image forming section;

said control section comprising means for accepting setting of a use limit of said apparatus, means for detecting a usage of an image forming medium in said apparatus, and means for determining, on the basis of the detected usage, whether said apparatus has reached the use limit, to prohibit image forming operation by said image forming section;

wherein said means for accepting setting of a use limit can be reset, and wherein the setting of the use limit quantitatively designates an inherent operation information which indicates a maximum designation limit for the image forming device.

13. The image forming apparatus according to claim 12, wherein:

said image forming medium is provided in a state contained in a container, and said means for detecting a usage determines the usage by counting the number of said container to be used.

14. The image forming apparatus according to claim 12, wherein:

ink is used as said image forming medium, said means for detecting a usage determines the usage by calculating an ink ejection amount.

15. The image forming apparatus according to claim 12, wherein:

said means for detecting a usage calculates the ink ejection amount on the basis of data of an image to be printed.

16. The image forming apparatus according to claim 12, wherein:

ink is used as said image forming medium, said means for detecting a usage has a sensor for measuring a remaining amount of the ink and calculates an ink usage on the basis of an output of said sensor thereby determining the usage.

17. An apparatus for forming an image, which comprises:

means for setting a use limit of said apparatus;

means for detecting a use degree of said apparatus; and means for determining whether the detected use degree has reached the use limit, to disable use of said apparatus;

wherein said means for setting a use limit takes in and stores therein externally given information representative of a use limit, and wherein the setting of the use limit quantitatively designates an inherent operation information which indicates a maximum designation limit for the image forming device.

18. The apparatus according to claim 17, wherein:

said information representative of a use limit to be given externally is provided in a state written on a recording medium, said means for setting a use limit having a connection part to said recording medium, and has a function of reading in the information representative of a use limit from said recording medium connected to said connection part and a function of invalidating the information representative of a use limit written on said recording medium.

19. The apparatus according to claim 17, wherein:

said information representative of a use limit to be given externally is provided in a state written on a recording medium, said means for setting a use limit has a connection part to said recording medium, and has a function of reading in the information representative of a use limit from said recording medium connected to said connection part, a function of subtracting the detected use degree from the information representative of a current use limit thereby generating information representative of a new use limit and a function of updating the use limit by writing the generated new use limit to said recording medium.

20. The apparatus according to claim 17, which further comprises:
an input section for accepting an external input,
wherein said means for setting a use limit has a function of accepting an input of information representative of a use limit through said input section and a function of storing inputted information representative of a use limit.

21. The apparatus according to claim 20, wherein:
said means for setting a use limit has a function of performing a decryption processing of the inputted information and extracting information representative of a use limit.

22. The apparatus according to claim 17, wherein:
said means for setting a use limit has a function of accepting an input of information representative of a use limit forwarded from a computer to which said apparatus is connected and a function of storing inputted information representative of a use limit.

23. The apparatus according to claim 11 or 17, which further comprises:
a display section for showing a state of said apparatus,
wherein said means for setting a use limit further has a function of display on said display section a remaining use limit showing to what degree it is usable from now on.

24. The apparatus according to claim 11 or 17, which further comprises:
means for selectively accepting setting as to an operation specification of said apparatus,
wherein said means for accepting an operation specification has a function of taking in externally inputted designation information and performing initial setting of said apparatus in accordance with the operation specification represented by the designated information, and
said image forming section forms an image on the basis of the designated operation specification.

25. A method of providing a recording material to be used in forming an image in an image forming apparatus, wherein:
a recording material is provided after operation capability designation information for designating an operation capability of said image forming apparatus using the recording material, is written to a memory attached to a container containing a recording material,
wherein, inherent capability information which indicates a maximum limit of designation for the image forming device is also written to said memory.

26. The method of providing a recording material according to claim 25, wherein:
when receiving an operation capability designation request including the operation capability designation information through a network, operation capability designation information corresponding to the request is forwarded as information for writing to said memory to a request source which sent the setting request, through a network.

27. A method of providing a recording material to be used in forming an image in an image forming apparatus, comprising:
previously writing an identifier for uniquely identifying each container containing said recording material to a memory attached thereto;
when receiving an operation capability designation request including operation capability designation information for designating an operation capability as to said image forming apparatus using said recording material through a network, examining whether the designation request includes the identifier, and where including the identifier, forwarding the received identifier and the operation capability designation information corresponding to the designation request as information for writing to said memory to a request source which the designation request sent, through a network; and
the operation capability designation information includes at least one of information qualitatively designating and information quantitatively designating inherent operation capability information which indicates a maximum designation limit for the image forming device.

28. The method of providing a recording material according to claim 25 or 27, wherein:
depending on an operation capability designated by operation capability designation information to be written to said memory, a price of said recording medium is determined to output a determined price.

29. A method of setting a use allowable amount to a recording material unit having a container which contains said recording material to be used for forming an image in an image forming apparatus and a memory attached to said container, wherein designation of an operation capability as to said image forming apparatus using said recording material, is carried out to said memory connected to a computer, from said computer, which comprises:
reading out currently stored operation capability designation information from said memory;
accepting an input of a designation request of an operation capability concerning the recording material contained in said container;
determining whether it is possible to designate an operation capability to be required by the accepted operation capability designation request with reference to the read-out operation capability designation information; and
writing new operation capability designation information to said memory where the designation can be done,
wherein the operation capability designation information contains information for designating at least one of quality and quantity in terms of capacity indicated by inherent capability information, where the inherent capability information indicates a maximum designation limit for the image forming device.

30. A method of managing sale of a recording material to be used for forming an image in an image forming apparatus, said recording material being sold contained in a container equipped with a memory, with a computer, which comprises:
carrying out, by said computer, processing of writing an identifier for uniquely identifying respective ones to said memory and processing of accumulating the written identifier;
when receiving a designation request of an operation capability as to said image forming apparatus using said recording material through a network, examining whether the designation request includes the accumulated identifier, and, where including the identifier, carrying out processing of forwarding operation capability designation information for designating an operation capability corresponding to the designation request and the received identifier as information for writing to said memory to a request source which sent the setting request through the network;

carrying out processing of determining a selling price of said recording material on the basis of the operation capability designation; and the operation capability designation being carried out by at least one of qualitatively designating and quantitatively designating inherent operation capability information which indicates a maximum designation limit for the image forming device, and the operation capability designation information including at least one of information qualitatively designating and information quantitatively designating inherent operation capability information.

31. A recording material unit containing therein a recording material to be used for forming an image in an image forming apparatus, which comprises:
a container containing therein a recording material; and
a memory attached to said container
wherein said memory has an area for writing operation capability designation information for designating an operation capability as to said image forming apparatus using the recording material, and
wherein said memory also has an area for writing inherent capability information which indicates a maximum designation limit for the image forming device.

32. The recording material unit according to claim 31, wherein:
predetermined certain operation capability designation information as to the recording material contained in said container is written in the area of said memory.

33. A system for assisting in designating an operation capability which assists in designating said operation capability as to recording material contained in a recording material unit containing the recording material used in image formation in an image formation apparatus, to the image forming apparatus using the recording material, comprising:
a container containing the recording material; and
a memory attached to said container;
wherein said memory has an area for writing operation capability designation information for designating an operation capability as to said image forming apparatus using the recording material, and wherein said memory also has an area for writing inherent capability information which indicates a maximum designation limit for the image forming device, and
wherein, when receiving a designation request of an operation capability through a network, operation capability designation information for designating a corresponding operation capability is forwarded as information for writing to said memory to a request source which sent the designation request, through the network.

34. A method of providing a recording material to be used for forming an image in an image forming apparatus, which comprises:
providing said recording material after writing information representative of a use allowable amount of said recording material contained in a container, to a memory attached to said container containing said recording material,
wherein, inherent capability information which indicates a maximum limit of designation for the image forming device is also written to said memory.

35. The method of providing a recording material according to claim 34, wherein:
when receiving a setting request of information representative of a use allowable amount through a network, information representative of a use allowable amount corresponding to the request and a program for writing the information representative of a use allowable amount to said memory are forwarded to a request source which sent the setting request, through the network.

36. A method of providing a recording material to be used for forming an image in an image forming apparatus, comprising:
previously writing an identifier for uniquely identifying respective ones to a memory attached to a container containing a recording material; and
when receiving a setting request of information representative of a use allowable amount through a network, examining whether the setting request includes the identifier, and, where including the identifier, forwarding the received identifier and the information representative of a use allowable amount corresponding to the setting request as information for writing to said memory to a request source which sent the setting request, through the network.

37. The method of providing a recording material according to any one of claim 34 or 36, wherein:
the information representative of a use allowable amount to be written to said memory is a value determined with an amount of 100% or less of the recording material contained in the container.

38. The method of providing a recording material according to claim 34 or 36, wherein:
a price of the recording material is determined on the basis of the information representative of a use allowable amount to be written to said memory, followed by outputting a determined price.

39. A method of setting a use allowable amount to a recording material unit having a container which contains said recording material to be used for forming an image in an image forming apparatus and a memory attached to said container, wherein setting of a use allowable amount, is carried out to said memory connected to a computer, from said computer, which comprises:
reading out currently stored use allowable amount from said memory;
accepting an input of a setting request of a use allowable amount concerning the recording material contained in said container;
determining whether it is possible to set a use allowable amount to be required by the accepted use allowable amount setting request with reference to the read-out use allowable amount; and
writing a new use allowable amount to said memory where the setting can be done,
wherein the setting of the use allowable amount quantitatively designates an inherent operation capability information which indicates a maximum designation limit for the image forming device.

40. A method of managing sale of a recording material to be
used for forming an image in an image forming apparatus, said recording material being sold contained in a container equipped with a memory, with a computer, which comprises:
carrying out, by said computer, processing of writing an identifier for uniquely identifying respective ones to said memory and processing of accumulating the written identifier; and
when receiving a setting request of information representative of a use allowable amount as to said image forming apparatus using said recording material through a network, examining whether the setting request includes the accumulated identifier, and, where including the identifier, carrying out processing of forwarding information representative of a use allowable amount corresponding to the setting request and the received identifier as information for writing to said memory to a request source which sent the setting request through the network; and carrying out processing of determining a selling price of said recording material on the basis of the information representative of the use allowable amount, wherein the setting of information showing the use allowable amount quantitatively designates inherent operation capability information which indicates a maximum designation limit for the image forming device, and the information showing the use allowable amount qualitatively designates inherent operation capability information.

41. A recording material unit containing therein a recording material to be used for forming an image in an image forming apparatus, which comprises:

a container containing therein a recording material; and a memory attached to said container;

wherein said memory has an area for writing information representative of a use allowable amount of the recording material contained in said container, and said memory also has an area for writing inherent capability information which indicates a maximum designation limit for the image forming device.

42. The recording material unit according to claim 41, wherein:

information representative of the use allowable amount of a predetermined certain amount of the recording material contained in said container is written in the area of said memory.

43. A system for assisting in setting a use allowable amount, which assists in setting said use allowable amount as to the recording material contained in the recording material unit, containing the recording material used in image formation in an image formation apparatus, comprising:

a container containing the recording material; and a memory attached to said container, wherein said memory has an area for writing information showing the use allowable amount of the recording material contained in the container, and wherein said memory also has an area for writing inherent limit information which indicates a maximum designation limit for the recording material, and wherein, when receiving a setting request of information representative of a use allowable amount through a network, information for writing information representative of a use allowable amount corresponding to the setting request to said memory is forwarded to a request source which sent the designation request, through the network.

* * * * *